(12) United States Patent
Hatsuda

(10) Patent No.: US 7,846,220 B2
(45) Date of Patent: Dec. 7, 2010

(54) ELECTROCHEMICAL CELL AND PRODUCTION METHOD THEREOF

(75) Inventor: Kouki Hatsuda, Tokyo (JP)

(73) Assignee: Sony Chemical & Information Device Corporation, Tokyo (JP)

( * ) Notice: Subject to any disclaimer, the term of this patent is extended or adjusted under 35 U.S.C. 154(b) by 37 days.

(21) Appl. No.: 11/995,989

(22) PCT Filed: Apr. 21, 2006

(86) PCT No.: PCT/JP2006/308930

§ 371 (c)(1),
(2), (4) Date: Jan. 17, 2008

(87) PCT Pub. No.: WO2007/010658

PCT Pub. Date: Jan. 25, 2007

(65) Prior Publication Data

US 2009/0035642 A1 Feb. 5, 2009

(30) Foreign Application Priority Data

Jul. 22, 2005 (JP) ............................. 2005-212980

(51) Int. Cl.
*H01M 6/00* (2006.01)
(52) U.S. Cl. ...................... 29/623.5; 429/186; 429/408; 429/409; 429/492
(58) Field of Classification Search ................ 29/623.5; 429/188, 409, 492
See application file for complete search history.

(56) References Cited

U.S. PATENT DOCUMENTS

| 6,632,256 B1 * | 10/2003 | Ishizaki et al. ............. 29/623.5 |
| 6,835,488 B2 * | 12/2004 | Sasahara et al. ............... 429/39 |
| 6,852,138 B1 * | 2/2005 | Topsoe et al. .............. 29/623.1 |
| 2002/0095780 A1 * | 7/2002 | Shadle et al. .............. 29/623.5 |
| 2004/0194821 A1 * | 10/2004 | Chittibabu et al. .......... 136/263 |
| 2005/0172482 A1 * | 8/2005 | Morishima et al. ............ 29/730 |
| 2006/0073385 A1 * | 4/2006 | Andrin et al. ............... 429/185 |

FOREIGN PATENT DOCUMENTS

| JP | 62-273514 | 11/1987 |
| JP | 9-309173 | 12/1997 |
| JP | 2000-2899 | 1/2000 |
| JP | 2003-16833 | 1/2003 |

OTHER PUBLICATIONS

Park et al., "Micropatterning of semicrystalline poly(vinylidene fluoride) (PVDF) solutions", European Polymer Journal 41 (2005) 1002-1012.*

J-M. Terascon et al., "Advanced Technologies for Polymer Battery", CMC Publishing Co. Ltd, under the supervision of Noboru Oyama.

* cited by examiner

*Primary Examiner*—Patrick Ryan
*Assistant Examiner*—Ladan Mohaddes
(74) *Attorney, Agent, or Firm*—Ditthavong Mori & Steiner, P.C.

(57) ABSTRACT

An electrochemical cell, and a method of producing an electrochemical cell are provided. The method includes a step in which a counter electrode film and a mold film are crimped. A sol-gel precursor is inserted into a pore in the mold film provided on the counter electrode film. The sol-gel precursor is cooled to form a semi-hardened gel. The mold film is peeled off from the counter electrode film. The semi-hardened gel is cooled to form a gel electrolyte film. The sealing film is provided on the counter film, with the gel electrolyte film being fitted in the pore of the sealing film. A working electrode film is crimped on the sealing film. The stacked films are thermocompression bonded, and a single electrochemical cell is produced by cutting.

4 Claims, 15 Drawing Sheets

ELECTROCHEMICAL CELL AND PRODUCTION METHOD THEREOF

TECHNICAL FIELD

The present invention relates to an electrochemical cell. The present invention also relates to a method of producing an electrochemical cell.

BACKGROUND ART

Recently, much attention has been attracted to electrochemical cells, such as electronic papers, electric double layer capacitors, dye-sensitized solar cells, lithium-ion cells or light control glasses. In the electrochemical cells, there is a method of producing each cell by sandwiching a polyvinylidene-fluoride—hexafluoropropylene copolymer (PVdF-HFP) gel electrolyte membrane between electrode films.

FIG. 19 shows a structure of a dye-sensitized solar cell as an example of a conventional electrochemical cell. An example of a working electrode film 7 includes a titanium-oxide electrode formed on a glass plate. An example of a counter electrode film 1 includes a platinum electrode formed on a glass plate. A gel electrolyte membrane 10 formed of PVdF-HFP gel is sandwiched between the working electrode film 7 and the counter electrode film. A sealing material 23 is placed in the circumference of this gel electrolyte membrane 10.

PVdF-HFP gel having a solid content of 50% still exhibits a superior characteristic such that ionic conductivity of the PVdF-HFP gel is not greatly impaired. PVdF-HFP gel is used for producing an electrochemical cell having a rigid electrode has been reported demonstrate in the laboratory (refer to Patent Document 1 and Non-patent Document 1, for example).

[Patent Document 1] Japanese laid-open patent publication No. 2003-16833

[Nonpatent Document 1] "Advanced Technologies for Polymer Battery" CMC Publishing Co. Ltd, under the supervision of Noboru Oyama

DISCLOSURE OF THE INVENTION

However, the above-mentioned conventional electrochemical cell has a problem in which neither adhesion between the gel and the electrode formed on the working electrode film nor adhesion between the gel and the electrode formed on the counter electrode film can be obtained. Almost all the gel has little tackiness so that little adhesion can be obtained between the gel and the electrodes.

Moreover, the above-mentioned conventional electrochemical cell has a problem in which it is difficult to prevent bubbles from arising between the gel and the electrode provided on the working electrode film and also between the gel and the electrode provided on the counter electrode film.

These are two prefunding problems in a display application, such as an electronic paper, and should be solved.

Meanwhile, the above-mentioned conventional electrochemical cell is produced using a hard working electrode film and a hard counter electrode film. Therefore, the electrochemical cell may not be produced by the roll-to-roll system and cannot be mass-produced.

In order to solve the problem, there may be provided method of producing an electrochemical cell by the roll-to-roll system, in which a flexible working electrode film and a flexible counter electrode film are employed.

However, the following problems may arise in the method of producing electrochemical cell by the roll-to-roll system. Gel cannot be produced in a predetermined shape or placed in a predetermined position on a roll. Since the gel has little mechanical strength, punching and machining cannot be performed on the gel in the production of a cell. The gel deforms in cutting so that machining cannot be performed on the gel.

The present invention is designed in light of the foregoing problems and an object of the present invention is to provide a novel electrochemical cell.

Also, another object of the present invention is to provide a novel method of producing an electrochemical cell.

In order to solve the above-mentioned problems and achieve the objects of the present invention, there is provided an electrochemical cell according to the present invention that includes a working electrode film, a counter electrode film facing the working electrode film, a gel electrolyte membrane sandwiched between the working electrode film and the counter electrode film, and a sealing portion sealing the circumference of the gel electrolyte membrane; wherein the working electrode film and the counter electrode film have flexibility.

A method of producing an electrochemical cell according to the present invention is includes inserting a sol-gel precursor into a pore of a mold film provided in a counter electrode film; cooling the sol-gel precursor to prepare a semi-harden gel; removing the mold film from the counter electrode film; forming a gel electrolyte membrane by cooling the semi-hardened gel; and providing a sealing film on the counter electrode film such that a pore of the sealing film corresponds to the gel electrolyte membrane.

A method of producing an electrochemical cell according to the present invention includes inserting a gel solution into a pore of a mold film provided in a counter electrode film; heating the gel solution to prepare a semi-hardened gel; removing the mold film from the counter electrode film; forming a gel electrolyte membrane by heating the semi-hardened gel; and providing a sealing film on the counter electrode film such that a pore of the sealing film corresponds to the gel electrolyte membrane.

A method of producing an electrochemical cell according to the present invention includes providing on a counter electrode film a cover-attached mold sealing film formed by a cover film and a mold sealing film; inserting a sol-gel precursor into a pore of the cover-attached mold sealing film; cooling the sol-gel precursor to prepare a semi-harden gel; removing the cover film from the mold sealing film; and forming a gel electrolyte membrane by cooling the semi-hardened gel.

A method of producing an electrochemical cell according to the present invention includes providing on a counter electrode film a cover-attached adhesive layer film formed by a cover film and an adhesive layer; inserting a sol-gel precursor into a pore of the cover-attached adhesive layer film; cooling the sol-gel precursor to prepare a semi-harden gel; removing the cover film from the adhesive layer; and forming a gel electrolyte membrane by cooling the semi-hardened gel.

The present invention may provide the following effectiveness.

According to the present invention, there is provided a novel electrochemical cell that includes a working electrode film, a counter electrode film facing the working electrode film, a gel electrolyte membrane sandwiched between the working electrode film and the counter electrode film, and a sealing portion sealing the circumference of the gel electrolyte membrane; wherein the working electrode film and the counter electrode film have flexibility.

According to the present invention, there is provided a novel method of producing an electrochemical including inserting a sol-gel precursor into a pore of a mold film provided in a counter electrode film; cooling the sol-gel precursor to prepare a semi-harden gel; removing the mold film from the counter electrode film; forming a gel electrolyte membrane by cooling the semi-hardened gel; and providing a sealing film on the counter electrode film such that a pore of the sealing film corresponds to the gel electrolyte membrane.

According to the present invention, there is provided a method of producing a novel electrochemical cell including inserting a gel solution into a pore of a mold film provided in a counter electrode film; heating the gel solution to prepare a semi-hardened gel; removing the mold film from the counter electrode film; forming a gel electrolyte membrane by heating the semi-hardened gel; and providing a sealing film on the counter electrode film such that a pore of the sealing film corresponds to the gel electrolyte membrane.

According to the present invention, there is provided a method of a novel electrochemical cell including providing on a counter electrode film a cover-attached mold sealing film formed by a cover film and a mold sealing film; inserting a sol-gel precursor into a pore of the cover-attached mold sealing film; cooling the sol-gel precursor to prepare a semi-harden gel; a removing the cover film from the mold sealing film; and forming a gel electrolyte membrane by cooling the semi-hardened gel.

According to the present invention, there is provided a method of producing an electrochemical cell providing on a counter electrode film a cover-attached adhesive layer film formed of a cover film and an adhesive layer; inserting a sol-gel precursor into a pore of the cover-attached adhesive layer film; cooling the sol-gel precursor to prepare a semi-harden gel; removing the cover film from the adhesive layer; and forming a gel electrolyte membrane by cooling the semi-hardened gel.

BEST MODE OF CARRYING OUT THE INVENTION

Below is a description of the best mode of carrying out the present invention.

First, a first best mode of carrying out the first invention is described in relation to an electrochemical cell and a method of producing the same.

Figure 1:
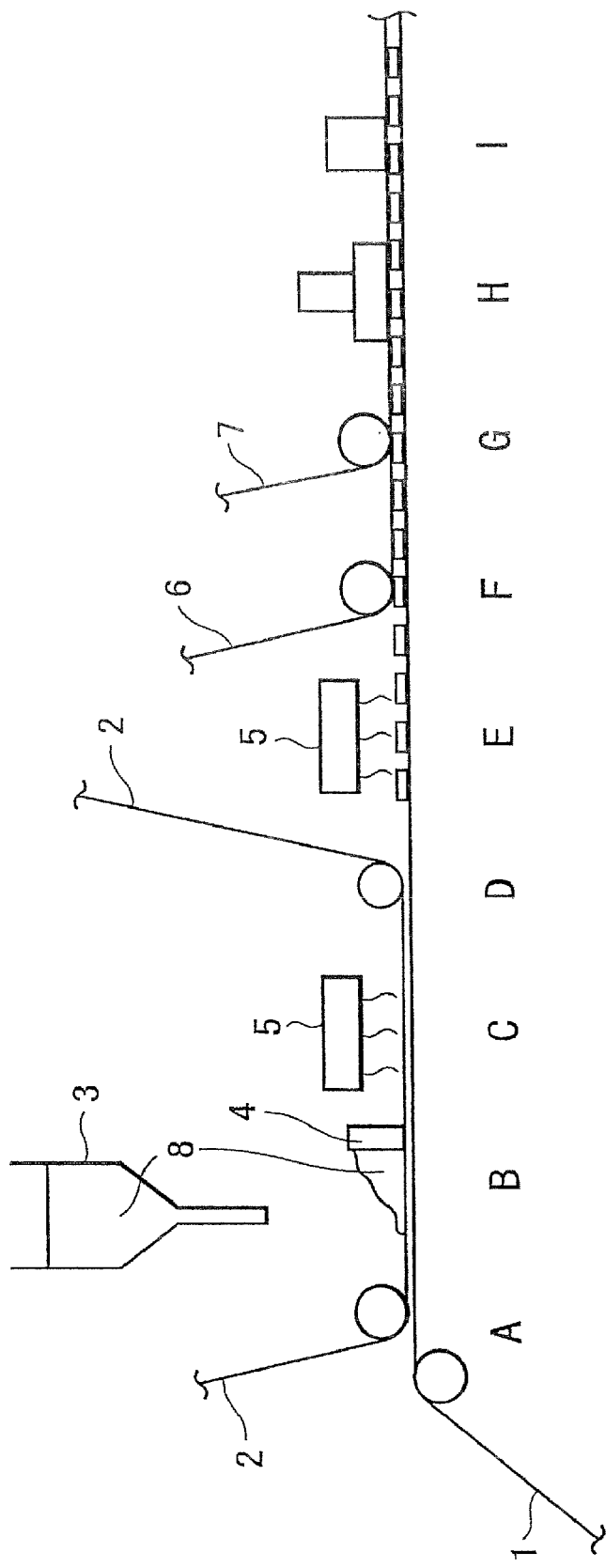
FIG. 1 is a view showing one example of a step in producing an electrochemical cell.

A method of producing an electrochemical cell is described. FIG. 1 shows a step in producing a cell of an electronic paper, as one example of a step in producing an electrochemical cell. FIG. 3 and FIG. 4 show details of the step in FIG. 1.

Figure 3A:
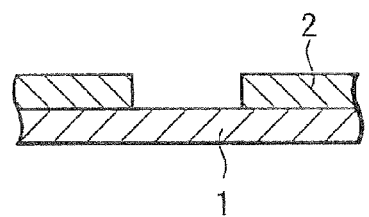
FIG. 3 includes views showing details of the step in FIG. 1 (Part 1).

Step A is described. In step A, a mold film 2 is provided on a counter electrode film 1 by crimping, as shown in FIG. 1A and FIG. 3A.

The counter electrode film 1 is described.

As the counter electrode film 1, an electrode-attached transparent film (ZEONOR produced by Zeon Corporation) is used. This counter electrode film 1 functions as a display electrode.

The thickness of the counter electrode film 1 is 100 μm. The thickness of the counter electrode film 1 is not limited to the aforementioned thickness. It is preferable that the thickness of the counter electrode film be in a range of 50 to 5000 μm. If the thickness is 50 μm or more, the counter electrode film can exhibit mechanical strength. If the thickness is 5000 μm or less, the counter electrode film exhibits flexibility according to application where the counter electrode film needs to have flexibility.

A material for a base film of the counter electrode film 1 is norbornene resin. It is needless to say that the material of the base film of the counter electrode film 1 is not limited to the norbornene resin.

An electrode of the counter electrode film 1 is formed of a silver-plating electrode. The electrode is not limited to this silver-plating electrode. In addition, it is possible to use electrodes using silver compounds, platinum, gold, and the like as the materials.

Figure 2A:
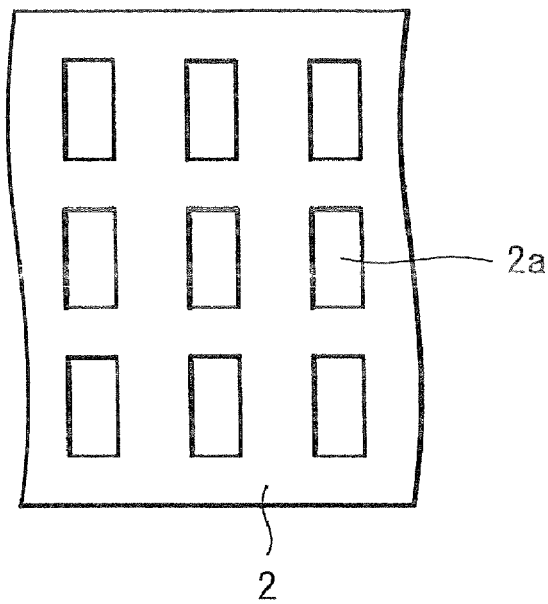
FIG. 2 includes a plan view showing structures of a mold film and a sealing film.

The mold film 2 is described. FIG. 2A is a plan view showing a structure of the mold film 2.

As the mold film 2, a three-layer film (NHFM produced by Aichi Plastics Industry Co. Ltd) formed with three layers of polyethylene-polypropylene-polyethylene is used.

The thickness of the mold film 2 is determined such that the thickness of a gel electrolyte membrane 10 corresponds to the thickness of a set electrolyte membrane when Step I have been completed. The thickness of the set electrolyte membrane defined in a description of Step I.

The material of the mold film 2 is not limited to the above-mentioned three-layer film formed with three layers of polyethylene-polypropylene-polyethylene, however, plastic films that are not eroded by a sol-gel precursor can also be used. Ionomer resin, modified propylene, and the like can be used.

Here, ionomer resin includes a metal ion that cross-links between molecules in an ethylene-methacrylic acid copolymer.

The dimensions of a pore 2a are 40 mm in length and 25 mm in width. The dimensions of the pore 2a are not limited to the aforementioned values. It is preferable that the length and width of the pore 2a be in a range of 5 to 500 mm. If the length and width of the pore 2a are 5 mm or more, it is advantageous that a sol-gel precursor 8 (described later) easily flows into the pore 2a. If the length and width of the pore 2a are 500 mm or less, it is advantageous that the thickness of the sol-gel precursor 8 can be uniformly maintained.

In FIG. 2A, the longitudinal direction of the pore 2a corresponds to a vertical direction. The longitudinal direction of the pore 2a is not limited to the aforementioned direction. In addition, a lateral direction, an oblique direction, and the like can be the longitudinal direction of the pore 2a. This is because that an optimal direction can be selected by adjusting a direction in which the sol-gel precursor 8 is applied according to the physical properties of the sol-gel precursor 8, such as viscosity.

Thermocompression bonding between the counter electrode film 1 and the mold film 2 is described.

The pressure in thermocompression bonding is 1000 N/cm². The pressure in thermocompression bonding is not limited to the aforementioned value. When the counter electrode film 1 and the mold film 2 are formed of various materials having various thicknesses, it is preferable that the pressure in thermocompression bonding fall in a range of 500 to 15000 N/cm².

The temperature in thermocompression bonding is 80° C. The temperature in thermocompression bonding is not limited to the aforementioned value. When the counter electrode film 1 and the mold film 2 are formed of various materials with various thicknesses, it is preferable that the temperature in thermocompression bonding be in a range of 50 to 100° C.

The peeling strength of the thermocompression bonding is 5 N/2 cm. The peeling strength of the thermocompression bonding is not limited to the aforementioned value. When the counter electrode film 1 and the mold film 2 are formed of various materials with various thicknesses, it is preferable that the peeling strength of the thermocompression bonding be in a range of 0.2 to 10 N/2 cm.

If the pressure, temperature, and peeling strength of the thermocompression bonding fall in the above-mentioned ranges, the following advantages can be obtained: when a thermocompression bonding portion of the counter electrode film 1 and the mold film 2 has little force to peel off, the thermocompression bonding portion may be prevented from being peeled off in a subsequent step; and when a thermocompression bonding portion of the counter electrode film 1 and the mold film 2 has force to peel off, the thermocompression bonding portion may easily be peeled off.

A tensile testing machine (TENSILON produced by Orientech Co. Ltd) is employed for measuring the peeling strength of the counter electrode film 1 and the mold film 2.

Figure 3B:
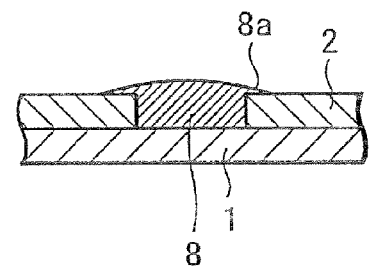

Step B is described. In Step B, as shown in FIG. 1B and FIG. 3B, a gelating agent and an electrolytic solution are heated and mutually mixed at a predetermined temperature to prepare a sol-gel precursor inside a supply unit 3. This sol-gel precursor is supplied to a coating unit 4. The coating unit 4 applies the sol-gel precursor to the pore of the mold film 2 provided on the counter electrode film 1.

The sol-gel precursor 8 is described.

The following conditions are required for a gel electrolyte membrane: the ionic conductivity is $1 \times 10^{-5}$ S/cm or more; the gel electrolyte membrane is a reversible gel which liquefies at high temperatures and gelates at normal temperature; and the gel electrolyte membrane holds electrolytic solution, and does not effuse the electrolytic solution even though some external pressure is applied to the gel electrolyte membrane.

The sol-gel precursor is prepared by mixing it with the following components at 150° C.

| | |
|---|---|
| polyvinylidene-fluoride - hexafluoropropylene copolymer (PVdF-HFP) (Kynar2801 produced by ATOFINA Japan Co. Ltd) | 20 parts |
| electrolytic solution (γ-BL) | 120 parts |
| titanium oxide | 20 parts |

Here, the composition of the electrolytic solution (γ-BL) is listed below.

| | |
|---|---|
| silver iodide | 250 mmol/L |
| sodium iodide | 350 mmol/L |
| triethanolamine | 10 g/L |
| coumarin | 5 g/L |
| 2-mercaptobenzimidazole | 5 g/L |

It is preferable that the composition of the gelating agent PVdF-HFP be in a range of 5 to 50 mass %. If the composition is 5 mass % or more, it is advantageous that gelatinization of the sol-gel precursor can be facilitated. If the composition is 50 mass % or less, it is advantageous that high ionic conductivity can be maintained.

The gelating agent is not limited to the above-mentioned PVdF-HFP. Besides, polyvinylidene-fluoride (PVdf), polyvinylidene-fluoride-tetrafluoroethylene copolymer, polyvinylidene-fluoride trifluoroethylene copolymer, polyvinylidene-fluoride-acrylonitrile copolymer, polyacrylonitrile, and the like can be used.

In the production of the sol-gel precursor, compositions to be mixed with the sol-gel precursor are not limited to titanium oxide other than the gelating agent and the electrolytic solution. Aluminum oxide, zinc oxide and the like can be mixed.

In the production of the sol-gel precursor, it is preferable that the heating temperature be in a range of 130 to 200° C. There is provided such an advantage that the sol-gel precursor melts, if the heating temperature is 130° C. or more. If the heating temperature is 200° C. or less, there is such provided such an advantage that electrolytic solvent can be prevented from evaporating.

The coating unit 4 is described.

As the coating unit 4, a knife coater is used. The coating unit 4 is not limited to the aforementioned the knife coater. A gravure coater, a spray coater, and the like may also be used.

The membrane thickness of the sol-gel precursor 8 applied to the inside of the pore 2a of the mold film 2 is determined such that the thickness of the gel electrolyte membrane 10 corresponds to the thickness of a set electrolyte membrane when Step I has been completed.

An application runover portion 8a (FIG. 3B) is described.

When the sol-gel precursor 8 is applied to the inside of the pore 2a of the mold film 2, a thin membrane (application runover portion 8a) of the sol-gel precursor forms on the circumference of the pore 2a of the mold film 2. This application runover portion 8a may hinder thermocompression bonding, for example, in an attempt to thermally bond the mold film 2 and another film.

Figure 3C:
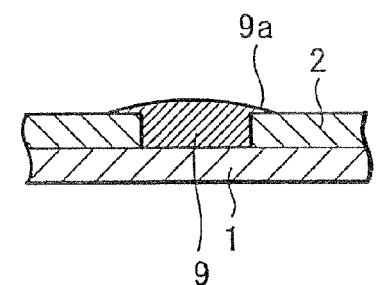

Step C is described. In Step C, the sol-gel precursor 8 is cooled to prepare a semi-hardened gel 9, as shown in FIG. 1C and FIG. 3C.

The cooling of the sol-gel precursor 8 is described.

The sol-gel precursor 8 is semi-gelated to prepare a semi-hardened gel due to the following reasons.

In Step D immediately subsequent to Step C, the mold film 2 is peeled off from the counter electrode film 1. At this time, if the mold film 2 is peeled off after the sol-gel precursor 8 has been fully gelated, an application runover portion 9a and the mold film 2 are firmly stuck each other. Accordingly, there arises a problem in which a gel is peeled off along with the mold film 2.

On the other hand, if the mold film 2 is peeled off without hardening the sol-gel precursor 8, the sol-gel precursor 8 will have low viscosity. Accordingly, there arises a problem in which the sol-gel precursor 8 flows out and deforms.

After the application, the sol-gel precursor 8 is cooled and gelated as time lapses. The sol-gel precursor 8 thus has an increased viscosity due to the gelation. The sol-gel precursor 8 is caused to be semi-gelated, until a certain viscosity is obtained, to prepare a semi-hardened gel. The above-mentioned problems can be solved accordingly.

The temperature for semi-hardening gels of the PVdF-HFP and other gelating agents is determined such that the viscosity of the semi-hardened gels may fall in a preferable range (described later).

It is preferable that the viscosity of the semi-hardened gels of the PVdF-HFP and other gelating agents fall in a range of 20 to 20000 mPas. If the viscosity is 20 mPas or more, there is such an advantage that the semi-hardened gels will not run out of shape. If the viscosity is 20000 mPas or less, the sol-gel precursor 8 is not completely gelated, so that there is such an advantage that the application runover portion 9a and the mold film 2 may not firmly stuck each other, thereby solving the aforementioned problem in which a gel is peeled off along with the mold film 2.

Figure 3D:
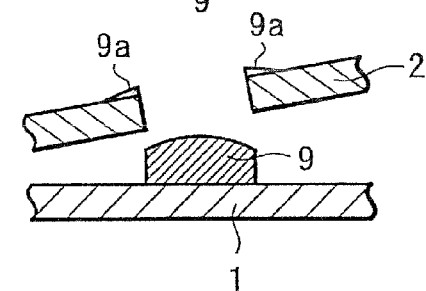

Step D is described. In Step D, the mold film 2 is peeled off from the counter electrode film 1, as shown in FIG. 1D and FIG. 3D.

The application runover portion 9a simultaneously sticks to the mold film 2 simultaneously when the mold film 2 is peeled off from the counter electrode film 1. Since the semi-hardened gel 9 is not completely gelated, the application runover portion 9a is easily cut and separated from the semi-hardened gel 9. As a result, it is possible to remove a runover portion of the semi-hardened gel 9 from the pore 2a of the mold film 2.

Figure 3E:
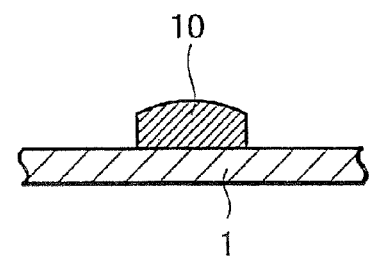

Step E is described. In Step E, a semi-hardened gel is cooled and gelated to form the electrolyte membrane, as shown in FIG. 1E and FIG. 3E. When a semi-hardened gel is cooled, entangled high-molecular compounds of a gelating agent precipitate, thereby gelating the semi-hardened gel. Notice that Step E may be omitted. For example, in the case of omitting Step E, when the interval between Step D prior to Step E and Step F (described later) subsequent to Step E has a substantially long distance, a semi-hardened gel is allowed to cool over time.

Figure 3F:
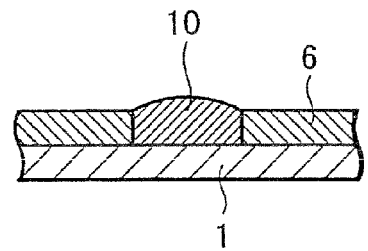

Step F is described. In Step F, a sealing film 6 is provided on the counter electrode film 1 such that a pore of the sealing film 6 corresponds to the gel electrolyte membrane 10, as shown in FIG. 1F and FIG. 3F. As a result, a sealing portion that seals the circumference of the gel electrolyte membrane 10 is formed.

Figure 2B:
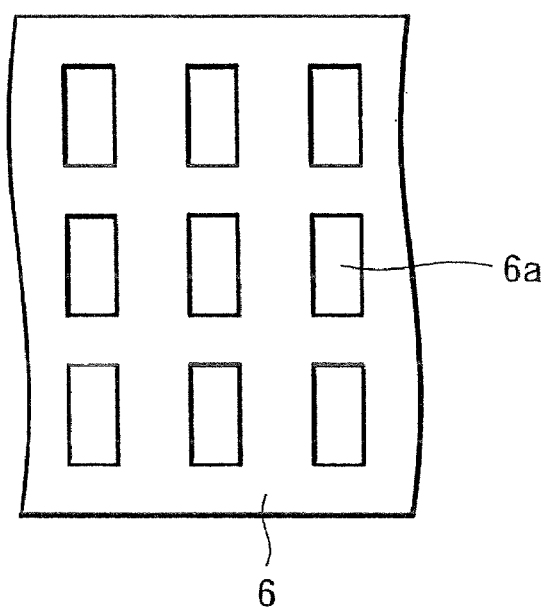

As the sealing film 6, a three-layer film (NHFM produced by Aichi Plastics Industry Co. Ltd) formed with three layers of polyethylene-polypropylene-polyethylene, shown in FIG. 2B, is employed.

The thickness of the sealing film 6 is determined such that the thickness of the sealing film 6 corresponds to the thickness of the sealing film when Step I has been completed. The thickness of the set sealing film is to be defined in a description of Step I.

The material of the sealing film 6 is not limited to the above-mentioned three-layer film formed with three layers of polyethylene-polypropylene-polyethylene. Ionomer resin, modified propylene, and the like can also be used.

The sealing film 6 is required to have electrolytic resistance. Accordingly, the electrolytic resistance of the sealing film 6 is evaluated.

As evaluation samples, the above-mentioned three-layer film formed with three layers of polyethylene-polypropylene-polyethylene, and an ionomer resin (HIMILAN produced by Du Pont-Mitsui Polychemicals Co. Ltd) is used.

The evaluation is conducted according to the following method. The sealing film 6 is immersed in the above-mentioned electrolytic solution ($\gamma$-BL), and a change in weight thereof is measured. If the sealing film 6 has a decreased weight in comparison to the weight thereof obtained in an initial stage, the sealing film 6 has dissolved in the electrolytic solution. If the sealing film 6 has an increase weight, the sealing film 6 has swollen.

It is preferable that an increased amount of the sealing film be 5 mass % or less. If the increased amount is 5 mass % or less, the swelling can be decreased, thereby resulting in obtaining an advantage that a cell gap can be decreased.

Further, a decreased amount of the sealing film be 5 mass % or less. If the decreased amount is 5 mass % or less, there is provided such an advantage that the sealing film 6 can exhibit sufficient scaling capability.

The sealing film 6 exhibits the following changes in weight. The three-layer film is decreased by 0.5 mass %. The ionomer resin is decreased by 3 mass %. As a result, these films exhibit a superior electrolytic resistance.

A pore 6a of the sealing film 6 is formed slightly larger in longitudinal length and lateral length than the pore 2a of the mold film 2. This facilitates locations of the pore 6a and the gel electrolyte membrane 10.

In Step F, locating the pore 6a and the gel electrolyte membrane 10 is an important factor in order to match the gel electrolyte membrane 10 with the pore 6a of the sealing film 6.

A method for location includes providing a guide pore in an electrode film in advances and using a pin for location. The method for location is not limited to the aforementioned method. A method of mechanical location can also be employed.

Thermocompression bonding between the counter electrode film 1 and the sealing film 6 is described.

The pressure in thermocompression bonding was 1000 N/cm². The pressure in thermocompression bonding is not limited to the aforementioned value. In the case of applying various thicknesses and materials to the counter electrode film 1 and the sealing film 6, it is preferable that the pressure in thermocompression bonding be in a range of 500 to 15000 N/cm².

The temperature in thermocompression bonding is 80° C. The temperature in thermocompression bonding is not limited to the aforementioned value. In the case of applying various thicknesses and materials to the counter electrode film 1 and the sealing film 6, it is preferable that the temperature in thermocompression bonding be in a range of 50 to 100° C.

The peeling strength after the thermocompression bonding is 5 N/2 cm. The peeling strength of the thermocompression bonding is not limited to the aforementioned value. In the case of applying various thicknesses and materials to the counter electrode film 1 and the sealing film 6, it is preferable that the peeling strength of the thermocompression bonding be in a range of 0.2 to 10 N/2 cm.

If the pressure, temperature and peeling strength of the thermocompression bonding are in the above-mentioned ranges, there is such an advantage that a thermocompression bonding portion can be prevented from peeling off in a subsequent step.

Figure 4A:
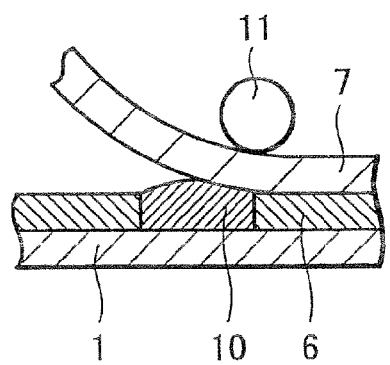
FIG. 4 includes views showing details of the step in FIG. 1 (Part 2).

Step G is described. In Step G, a working electrode film 7 is crimped on the sealing film 6, as shown in FIG. 1G and FIG. 4A.

The working electrode film 7 is described.

The working electrode film 7 is located to face the counter electrode film 1. As the working electrode film 7, an ITO film (OTEC produced by Oji-Tobi Co. Ltd) is used. This working electrode film 7 functions as a display electrode.

The thickness of the working electrode film 7 is 100 μm. The thickness of the working electrode film 7 is not limited to the aforementioned thickness. In addition, it is preferable that the thickness be in a range of 50 to 5000 μm. If the thickness is 50 μm or more, there is such an advantage that mechanical strength can be obtained. If the thickness is 5000 μm or less, there is such an advantage that flexibility corresponding to an application that needs for bending can be obtained.

The material of a base film in the working electrode film 7 is polyethylene terephthalate (PET). The material of the base film in the working electrode film 7 is not limited to the aforementioned polyethylene terephthalate (PET). Polybutylene phthalate, polyimide, polycarbonate, and the like can also be used.

An electrode of the working electrode film 7 is formed with an ITO electrode. The electrode is not limited to this ITO electrode. Transparent electrode membranes IZO and ATO, and the like can also be used.

Thermocompression bonding between the working electrode film 7 and the sealing film 6 is described.

The pressure in thermocompression bonding is 1000 N/cm$^2$. The pressure in thermocompression bonding is not limited to the aforementioned value. In the case of applying various thicknesses and materials to the working electrode film 7 and the sealing film 6, it is preferable that the pressure in thermocompression bonding be in a range of 50 to 15000 N/cm$^2$.

The temperature in thermocompression bonding is 80° C. The temperature in thermocompression bonding is not limited to the aforementioned value. In the case of applying various thicknesses and materials to the working electrode film 7 and the sealing film 6, it is preferable that the temperature in thermocompression bonding be in a range of 50 to 100° C.

The peeling strength between the working electrode film 7 and the sealing film 6 is 5 N/2 cm. The peeling strength between the counter electrode film 1 and the sealing film 6 was 5 N/2 cm. The peeling strength of the thermocompression bonding is not limited to the aforementioned values. In the case of applying various thicknesses and materials to the working electrode film 7, the sealing film 6, and the counter electrode film 1, it is preferable that the peeling strength of thermocompression bonding be in a range of 0.2 to 10 N/2 cm.

If the pressure, temperature and peeling strength of the thermocompression bonding are in the above-mentioned ranges, there is such an advantage that a thermocompression bonding portion can be prevented from peeling off in a subsequent step.

Between the working electrode film 7 and the gel electrolyte membrane 10, it is possible to prevent bubbles from arising by thermocompression bonding. Since the gel electrolyte membrane has a sufficient hardness, and the working electrode film 7 and the gel electrolyte membrane 10 is stuck by lamination while compressing them to push the air out, it is possible to prevent bubbles from arising.

Figure 4B:
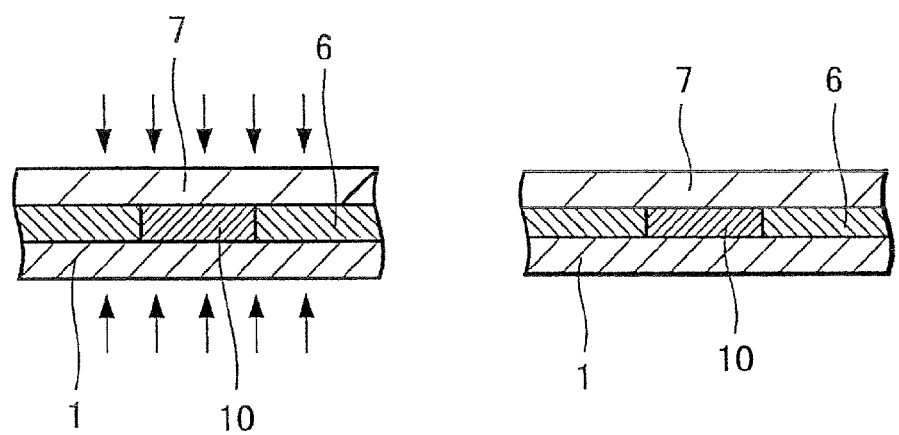

Step H is described. In Step H, thermocompression bonding between the working electrode film 7 and the sealing film 6, and thermocompression bonding between the counter electrode film 1 and the sealing film 6 are preformed, as shown in FIG. 1H and FIG. 4B. As shown in the drawing on the left of FIG. 4B, thermocompression bonding is carried out on a predetermined region at a predetermined pressure and temperature for a predetermined time.

As a result, as shown in the drawing on the right of FIG. 4B, the working electrode film 7 and the sealing film 6 are thermally crimped firmly, and also the counter electrode film 1 and the sealing film 6 are thermally crimped firmly. It should be noted that the thermocompression bonding in Step F and Step G is weak thermocompression bonding aimed at preventing a thermocompression bonding portion from peeling off in a subsequent step, whereas the thermocompression bonding in Step H is strong thermocompression bonding aimed at ensuring sealing performance between the working electrode film 7 and the sealing film 6, as well as sealing performance between the counter electrode film 1 and the sealing film 6.

In the thermocompression bonding, a thermocompression bonding apparatus (Heat-Seal Bonder produced by Ohashi Engineering Co. Ltd) is used.

Of the region for thermocompression bonding, it is preferable that the sealing film 6 be located to have a distance from an end closest to the gel electrolyte membrane 10 being in a range of 5 to 50 mm. If the distance from the edge is 5 mm or more, there is such an advantage that sufficient sealing can be performed. If the distance from the edge is 50 mm or less, there is such an advantage that no trouble will be caused in half cut and extraction detachment which are to be carried out later.

The pressure in thermocompression bonding is 5000 N/cm$^2$. The pressure in thermocompression bonding is not limited to the aforementioned value. In the case of applying various thicknesses and materials to the working electrode film 7, the sealing film 6, and the counter electrode film 1, it is preferable that the pressure in thermocompression bonding be in a range of 1000 to 15000 N/cm$^2$.

The temperature in thermocompression bonding is 140° C. The temperature in thermocompression bonding is not limited to the aforementioned value. In the case of applying various thicknesses and materials to the working electrode film 7, the sealing film 6, and the counter electrode film 1, it is preferable that the temperature in thermocompression bonding be in a range of 120 to 180° C.

The time required for the thermocompression bonding is 40 seconds. The time required for the thermocompression bonding is not limited to the aforementioned value. In the case of applying various thicknesses and materials to the working electrode film 7, the sealing film 6, and the counter electrode film 1, it is preferable that the time required for the thermocompression bonding be in a range of 0.1 to 100 seconds.

The peeling strength between the working electrode film 7 and the sealing film 6 is 13 N/2 cm. The peeling strength between the counter electrode film 1 and the sealing film 6 is 13 N/2 cm. The peeling strength of the thermocompression bonding is not limited to the aforementioned values. In the case of applying various thicknesses and materials to the working electrode film 7, the sealing film 6, and the counter electrode film 1, it is preferable that the peeling strength of the thermocompression bonding be in a range above 13 N/2 cm.

If the pressure, temperature, time and peeling strength of the thermocompression bonding are in the above-mentioned ranges, there is such an advantage that sufficient adhesion can be obtained without causing deformation of the sealing film 6.

The method of thermocompression bonding is not limited to the above-mentioned method. The heat lamination method, the ultrasonic deposition method, and the like can also be employed.

By the thermocompression bonding, adhesion can be obtained between the working electrode film 7 and the gel electrolyte membrane 10 and also adhesion between the counter electrode film 1 and the gel electrolyte membrane 10. Since the electrode films have flexibility, electrodes of the electrode films can be pressed against the gel electrolyte membrane by applying pressure from outside.

By the thermocompression bending, sealing performance can be obtained between the working electrode film 7 and the sealing film 6, and sealing performance can also be obtained between the counter electrode film 1 and the sealing film 6 can. The sealing film 6 melts due to the thermocompression bonding, facilitating the sealing film 6 to flow into concave and convex portions of the electrodes.

As shown in the drawing on the right of FIG. 4B, the gel electrolyte membrane 10 and the sealing film 6 sandwiched between the working electrode film 7 and the counter electrode film 1 are both formed slightly thinner due to the thermocompression bonding. The proportion of decreased thickness through the thermocompression bonding is in a range of 5-20%. By allowing to decrease the thickness of the counter electrode film 1, adhesion can be obtained between the working electrode film 7 and the gel electrolyte membrane 10, adhesion can be obtained between the counter electrode film 1 and the gel electrolyte membrane 10, adhesion can be obtained between the working electrode film 7 and the sealing film 6, and further adhesion can be obtained between the counter electrode film 1 and the sealing film 6.

Step I is described. In Step I, the working electrode film 7, the sealing film 6, and the counter electrode film 1 are cut to produce a single electrochemical, as shown in FIG. 1I and FIG. 4C.

Figure 4C:
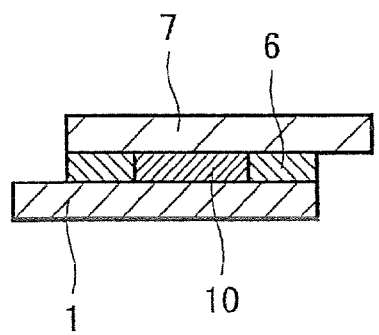

As shown by the drawing on the left in FIG. 4C, the counter electrode film 1 is cut such that the counter electrode film 1 has a longer length than that of the working electrode film 7 and the sealing film 6, thereby allowing to expose the electrode of the counter electrode film 1. Further, as shown by the drawing on the right in FIG. 4C, the working electrode film 7 is cut such that the working electrode film 7 has a longer length than that of the counter electrode film 1 and the sealing film 6, thereby allowing to expose the electrode of the working electrode film 7.

The electrodes are exposed so that of the electrode of the counter electrode film 1 and a flexible substrate are crimped to be electrically connected, and the electrode of the working electrode film 7 and the flexible substrate a crimped to be electrically connected using an anisotropic conductor film (ACF) in a subsequent step.

The thickness of a set electrolyte membrane and a set sealing film thickness are defined. The thickness of the set electrolyte membrane indicates the thickness of the gel electrolyte membrane 10 after Step I has been completed. The thickness of the set sealing film indicates the thickness of the sealing film 6 after Step I has been completed.

The thickness of the set electrolyte membrane is 100 μm. The thickness of the set electrolyte membrane is not limited to the aforementioned value. It is preferable that the thickness of the set electrolyte membrane be in a range of 30 to 500 μm. If the thickness of the set electrolyte membrane is 30 μm or more, there is such an advantage that the set electrolyte membrane functions as a display element such as an electronic paper. If the thickness of the set electrolyte membrane is 500 μm or less, there is such an advantage that internal resistance or an electrochemical characteristic of an electrolyte membrane can be prevented from increasing.

The thickness of the set sealing film has been formed equal to the thickness of the set electrolyte membrane. Only a small change is observed in the thickness of a gel electrolyte membrane that does not contain solvent.

In a step other than Steps A to I, an IC chip is mounted on the flexible substrate, that is, a COF (chip on flexible substrate) for a driver IC is realized.

In a step subsequent to Step I, connection of an anisotropic conductor film (ACF) is realized. Since a circuit of the flexible substrate can be heat pressed with the electrodes of the films using a bonder.

Steps A to I and a subsequent step have been described above. In these steps, an electrochemical cell is produced by the roll-to-roll system. Production of an electrochemical cell of the present invention is not limited to the roll-to-roll system. It is also possible to produce a single electrochemical cell by a batch system.

An electrochemical cell can be produced by the roll-to-roll system through Steps A to I. Electrochemical cells of gel can rapidly and inexpensively be mass produced by the roll-to-roll system. Since a mold is employed in this method, it is not necessary to greatly reduce liquid components in a gel, which enables to produce an electrochemical cell as a gel. Further, since the gel utilized is a physical gel, an initiator such as peroxide is not required for production, thereby enabling to safely produce the electrochemical cells of gel.

The electronic paper produced through Steps A to I and the subsequent step are evaluated. Evaluation items are: (1) adhesion between a working electrode film and a gel electrolyte membrane, and between a counter electrode film and the gel electrolyte membrane; (2) bubbles occurrence at the interface between the working electrode film and the gel electrolyte membrane, and at the interface between the counter electrode film and the gel electrolyte membrane; (3) performance in the electronic paper as a device.

An evaluation method of the electronic paper is described.

The adhesion between the working electrode film and the gel electrolyte membrane, and between the counter electrode film and the gel electrolyte membrane are evaluated as follows. After a device was allowed stand at 60° C. for seven days, whether or not the device became white due to peeling was determined with the naked eye.

Bubble occurrence at the interface between the working electrode film and the gel electrolyte membrane, and at the interface between the counter electrode film and the gel electrolyte membrane were evaluated as follows. In a dot-matrix cell, whether or not black can be displayed on the whole surface was examined with an optical microscope.

Performance in the electronic paper as a device, or more specifically, ionic conductivity (S/cm) in the gel electrolyte membrane was evaluated as follows. The ionic conductivity (S/cm) was measured according to the alternating-current impedance method (Solatron 1260). The ionic conductivity is calculated by the following equation.

$$\sigma = l/(S \times R)$$

l: length of cell, S: space of electrode

An evaluation result is described.

In evaluating adhesion between the working electrode film and the gel electrolyte membrane, and between the counter electrode film and the gel electrolyte membrane, no white portion was observed with the naked eye.

Bubble occurrence at the interface between the working electrode film and the gel electrolyte membrane, and at the interface between the counter electrode film and the gel electrolyte membrane, black dots were observed on the whole surface by an optical microscope.

The ionic conductivity $\sigma$(S/cm) of the gel electrolyte membrane of PVdF-HFP-based gel was as follows: $\sigma = 8.3 \times 10^{-5}$ (S/cm).

Application of an electrochemical cell of the present invention is not limited to an electronic paper.

The electrochemical cell can be applied to an electric double layer capacitor, a dye-sensitized solar cell, a lithium-ion cell, or a light control glass (hereinafter referred to as "application examples such as an electric double layer capacitor").

A method of producing application examples such as an electric double layer capacitor is described.

The method of producing application examples such as an electric double layer capacitor is basically similar to the above-mentioned method of producing a cell of an electronic paper. A method of producing application examples such as an electric double layer capacitor is described, which differs from the above-mentioned method of producing a cell of an electronic paper.

Electrodes of counter electrode films 1 of the application examples such as an electric double layer capacitor are described. A carbon electrode or the like can be used for an electrode of a counter electrode film 1 of an electric double layer capacitor. A platinum electrode, a carbon electrode or the like can be used for an electrode of a counter electrode film 1 of a dye-sensitized solar cell. A carbon electrode or the like can be used for an electrode of a counter electrode film 1 of a lithium-ion cell. A carbon electrode, a metal-oxide electrode or the like can be used for an electrode of a counter electrode film 1 of a light control glass.

Electrolytic solutions of sol-gel precursors of the application examples such as an electric double layer capacitor are described. As an electrolytic solution of a sol-gel precursor of the electric double layer capacitor, a nonaqueous solvent such as propylene carbonate, utilizing quaternary ammonium salt, quaternary sulfonium salt, or the like as an electrolyte can be used. As an electrolytic solution of a sol-gel precursor of the dye-sensitized solar cell, a nonaqueous solvent utilizing iodine and iodine salt as a main electrolyte or the like can be used. As an electrolytic solution of a sol-gel precursor of the dye-sensitized solar cell, a nonaqueous solvent such as propylene carbonate utilizing lithium salt ($LiPF_6$) or the like as an electrolyte can be used. As an electrolytic solution of a sol-gel precursor of the light control glass, a nonaqueous solvent such as propylene carbonate utilizing an electrochromic material such as viologen as an electrolyte, or the like can be used.

Electrodes of working electrode films 7 of the application examples such as an electric double layer capacitor are described. A carbon electrode or the like can be used for an electrode of a working electrode film 7 of the electric double layer capacitor. An electrode in which a titanium-oxide membrane contains dye, or the like can be used for an electrode of a working electrode film 7 of the dye-sensitized solar cell. $LiCoO_3$, $LiNiO_2$, $LiMn_2O_4$ or the like can be used for an electrode of a working electrode film 7 of the lithium-ion cell. A transparent conductive membrane (ITO) or the like can be used for an electrode of a working electrode film 7 of the light control glass.

An electrochemical cell using a gel electrolyte membrane of PVdF-HFP-based gel is superior to a conventional electrochemical cell in the adhesion of the gel electrolyte membrane, and can therefore prevent bubbles from arising. Also, a gel electrolyte has high ionic conductivity, and therefore it possible to obtain equal or better performance than a conventional electrochemical cell. The electrochemical cell has flexibility, and can therefore be used for completely new applications such as a card. Also, the gel electrolyte membrane has chemical stability.

Application of an electrochemical cell of the present invention is not limited to an electronic paper, an electric double layer capacitor, a dye-sensitized solar cell, a lithium-ion cell or a light control glass. An electrochemical cell of the present invention can be applied to other cells, an electrochemical sensor, and the like.

Thus, according to the best mode of carrying out the present invention, a novel electrochemical cell can be provided by including an electrochemical cell having a working electrode film, a counter electrode film facing the working electrode film, a gel electrolyte membrane sandwiched between the working electrode film and the counter electrode film, and a sealing portion sealing the circumference of the gel electrolyte membrane; where the working electrode film and the counter electrode film have flexibility.

According to the best mode of carrying out the present invention, it is possible to provide a novel method of producing an electrochemical cell including a step of inserting a sol-gel precursor into a pore of a mold film provided in a counter electrode film; a step of cooling the sol-gel precursor to prepare a semi-harden gel; a step of peeling the mold film from the counter electrode film; a step of forming a gel electrolyte membrane by cooling the semi-hardened gel; and a step of providing a sealing film on the counter electrode film such that a pore of the sealing film corresponds to the gel electrolyte membrane.

It should be noted that the present invention is not limited to the above-mentioned best mode of carrying out the invention, but various other structures can be employed without deviating from the gist of the present invention, of course.

Figure 5:
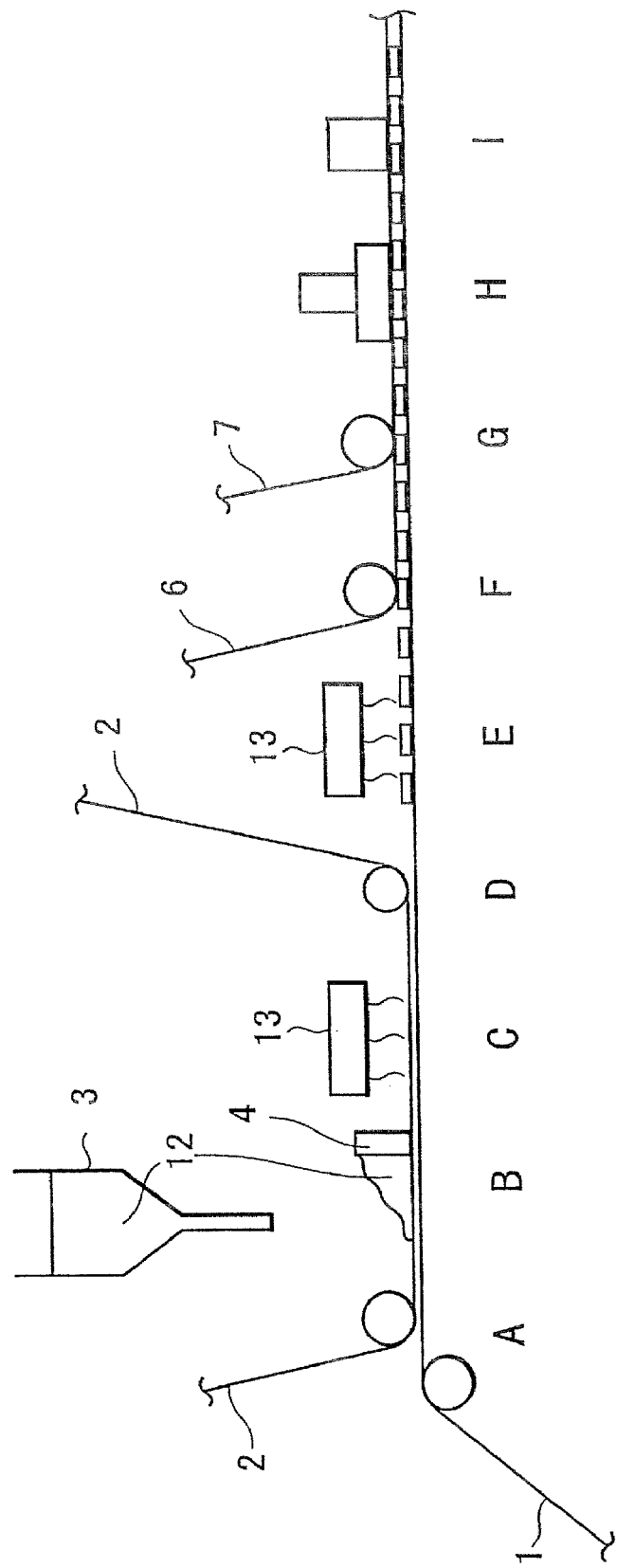
FIG. 5 is a view showing another example of a step in producing an electrochemical cell.

Next, a second best mode of carrying out the invention concerning an electrochemical cell and a method of producing the same is described. FIG. 5 shows a step in producing a cell of an electronic paper, as another example of a step of producing an electrochemical cell FIG. 6 shows details of the step in FIG. 5.

Step A is similar to the step in the first best mode of carrying out the invention.

Figure 6A:
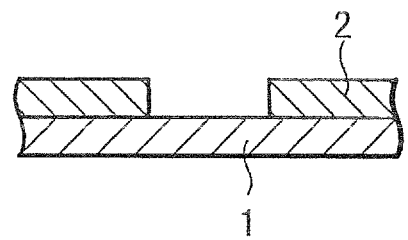
FIG. 6 is a view showing details of the step in FIG. 5.
Figure 6B:
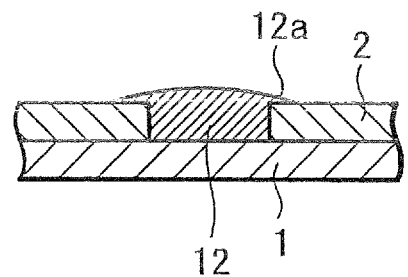

Step B is described. In Step B, a gel solution is prepared by heating and mixing a gelating agent, an electrolytic solution and a solvent at a predetermined temperature inside a supply unit 3, as shown in FIG. 5B and FIG. 6B. This gel solution is supplied to a coating unit 4. The coating unit 4 applies the gel solution to a pore of a mold film 2 provided on a counter electrode film 1.

The gel solution is described.

The gel solution is produced by mixing the following gel electrolyte membrane components and solvent at 70° C.

| gel electrolyte membrane components | |
| --- | --- |
| polyvinylidene-fluoride - hexafluoropropylene copolymer (PVdF-HFP) (Kynar2801 produced by ATOFINA Japan Co. Ltd) | 20 parts |
| electrolytic solution (γ-BL) | 120 parts |
| titanium oxide | 20 parts |

Here, the electrolytic solution is similar to that in the first best mode of carrying out the invention

| solvent | |
| --- | --- |
| dimethyl carbonate (DMC) | 60 parts |

The appropriate range of the gelating agent PVdF-HFP composition in the gel electrolyte membrane components is similar to that in the first best mode of carrying out the invention.

It is preferable that the proportion of the solvent to the gel electrolyte membrane components be in a range of 5 to 1000 mass %. If the proportion of the solvent is 5 mass % or more, there is such an advantage that the range in which viscosity control is possible enlarges due to the inclusion of the solvent. If the proportion of the solvent is 1000 mass % or less, there is such an advantage that temperature control is facilitated without azeotropy of dimethyl carbonate and electrolytic solvent (γ-butyrolactone).

The same gelating agent, an electrolyte and other components as those in the first best mode of carrying out the invention are used.

The solvent is not limited to dimethyl carbonate. Diethyl carbonate, methyl ethyl carbonate, acetone and the like can also be used. It is preferable that the solvent be other organic solvent than the electrolytic solution, the boiling point of which is relatively low and which is later evaporated by heating and not mixed into a final product.

In the production of the gel solution, it is preferable that the heating temperature be in a range of 50 to 150° C. If the heating temperature is 50° C. or more, there is such an advantage that viscosity control is facilitated. If the heating temperature is 150° C. or less, there is such an advantage that the electrolytic solvent can be prevented from evaporating.

The coating unit 4 used is similar to that in the first best mode of carrying out the invention.

The membrane thickness of the gel solution applied to the inside of the pore of the mold film 2 used is similar to that of the membrane thickness of the sol-gel precursor 8 in Step B of the first best mode of carrying out the invention.

Figure 6C:
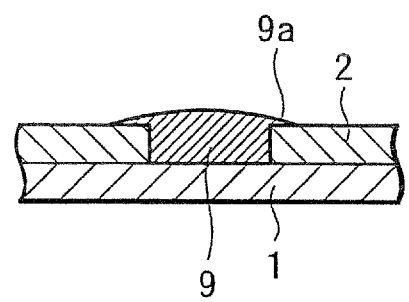
Figure 6D:
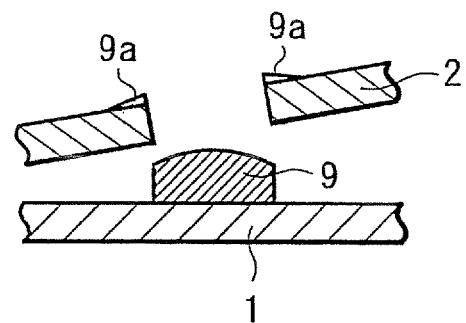

Step C is described. In Step C, by heating the gel solution, the gel solution is heated, semi-gelated, and evaporated to prepare a semi-hardened gel 9, as shown in FIG. 5C and FIG. 6C.

The heating of the gel solution is described. As the method of heating, a method of blasting hot air, a method of applying infrared rays, or the like can be used.

The temperature of semi-hardened gels such as the PVdF-HFP and other gelating agents is determined such that the viscosity of the semi-hardened gels fall in a suitable range (described later).

It is preferable that the viscosity of semi-hardened gels such as the PVdF-HFP and other gelating agents be in a range of 20 to 20000 mPas. If the viscosity is 20 mPas or more, there is such an advantage that the semi-hardened gels will not deform. If the viscosity is 20000 mPas or less, the semi-hardened gels are not completely gelated, so that there is such an advantage that an application runover portion 9a and the mold film 2 can be prevented from becoming firmly stuck together, and a problem in which a gel is peeled off along with the mold film 2 is therefore removed.

Step D is similar to that in the first best mode of carrying out the invention.

Figure 6E:
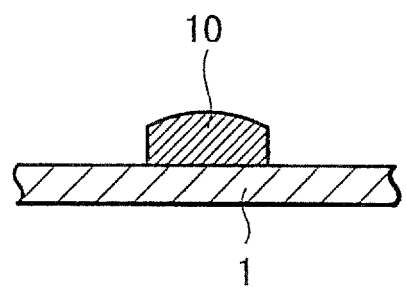

Step E is described. In Step E, a gel electrolyte membrane 10 is formed by heating a semi-hardened gel, as shown in FIG. 5E and FIG. 6E. The method of heating is similar to that in Step C.

Steps F to I and a subsequent step are similar to those in the first best mode of carrying out the invention.

Steps A to I and a subsequent step will be described. In these steps, an electrochemical cell is produced by the roll-to-roll system. Production of an electrochemical cell of the present invention is not limited to the roll-to-roll system. It is also possible to produce a single electrochemical cell according to the so-called batch system.

With the method of Steps A to I, similar effectiveness to the first best mode of carrying out the invention can be obtained. Further, with the use of a gel solution, there can be obtained such effectiveness that the freedom degree of viscosity adjustment is great in comparison with a sol-gel precursor, thereby facilitating the gel solution to flow into the pore of the mold film 2 easily.

An electronic paper produced through Steps A to I and the subsequent step was evaluated. Evaluation items and the evaluation method are similar to those in the first best mode of carrying out the invention.

An evaluation result is described.

In evaluation adhesion between a working electrode film and a gel electrolyte membrane, and between a counter electrode film and the gel electrolyte membrane, no white portion indicating adhesiveness was observed with the naked eye.

In evaluating bubble occurrence at the interface between the working electrode film and the gel electrolyte membrane, and at the interface between the counter electrode film and the gel electrolyte membrane, black dots indicating bubble occurrence were observed on the whole surface with an optical microscope.

The ionic conductivity σ(S/cm) of the gel electrolyte membrane of PVdF-HFP-based gel was σ=7.0×10$^{-5}$ (S/cm).

Next, a method of producing application examples such as an electric double layer capacitor is described. The method of producing application examples such as an electric double layer capacitor is basically similar to the above-mentioned method of producing a cell of an electronic paper. In addition, electrodes of counter electrode films 1, electrodes of working electrode films 7 and electrolytic solutions of gel solutions in the application examples such as an electric double layer capacitor are similar to the electrodes of the counter electrode films 1, the electrodes of the working electrode films 7 and the electrolytic solutions of the sol-gel precursors respectively in the application examples such as an electric double layer capacitor explained in the first best mode of carrying out the invention.

An electrochemical cell using a gel electrolyte membrane of PVdF-HFP-based gel can provide effectiveness similar to the first best mode of carrying out the invention.

Thus, according to the best mode of carrying out the present invention, a novel electrochemical cell can be provided by including an electrochemical cell having a working electrode film, a counter electrode film facing the working electrode film, a gel electrolyte membrane sandwiched between the working electrode film and the counter electrode film, and a sealing portion sealing the circumference of the gel electrolyte membrane, where the working electrode film and the counter electrode film have flexibility.

According to the best mode of carrying out the present invention, a novel method of producing an electrochemical cell can be provided by including a step of inserting a gel solution into a pore of a mold film provided in a counter electrode film; a step of heating the gel solution to prepare a semi-hardened gel; a step of peeling the mold film from the counter electrode film; a step of forming a gel electrolyte membrane by heating the semi-hardened gel; and a step of providing a sealing film on the counter electrode film such that a pore of the sealing film corresponds to the gel electrolyte membrane.

It should be noted that the present invention is not limited to the above-mentioned best mode of carrying out the invention but can employ various other structures without deviating from the gist of the present invention, of course.

Next, a third best mode of carrying out the invention concerning an electrochemical cell and a production method thereof is described.

A method of producing an electrochemical cell is described.

Steps A to E are similar to those in the first best mode of carrying out the invention.

Step F is described. In the Step F, a sealing film 6 is provided on a counter electrode film 1 such that a pore 6a of the sealing film 6 fits a gel electrolyte membrane 10. As a result, a sealing portion sealing the circumference of the gel electrolyte membrane 10 is formed.

The sealing film 6 is similar to that in the first best mode of carrying out the invention, except for the size of the pore 6a.

The pore 6a of the sealing film 6 is larger than the pore 2a of the mold film 2 by a predetermined width with respect to both the longitudinal length and lateral length thereof. It is preferable that the predetermined width be in a range of 0.5 to 5 mm. If the predetermined width is 0.5 mm or more, there is such an advantage that an electrolytic solution and the sealing film can be prevented from being in contact with each other. If the predetermined width is 5 mm or less, there is such an advantage that adhesion is maintained with a gel sufficiently sandwiched between electrode films.

Steps G to I and a subsequent step are similar to those in the first best mode of carrying out the invention.

Figure 7:
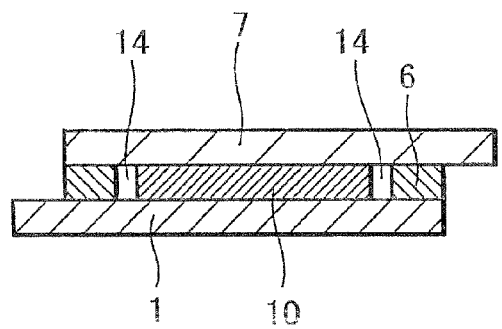
FIG. 7 is a view showing an example of an electrochemical cell to which spaces are provided.

In Step I, an electrochemical cell such as is shown in FIG. 7 is obtained. The FIG. 7 shows an example in which spaces are provided in an electrochemical cell. There are gaps created between the sealing film 6 and the gel electrolyte membrane 10, so that the sealing film 6 and the gel electrolyte membrane 10 are in a non-contact state.

Steps A to I and a subsequent step will be described. In these steps, an electrochemical cell is produced by the roll-to-roll system. Production of an electrochemical cell of the present invention is not limited to this roll-to-roll system. It is possible to produce a single electrochemical cell by the batch system.

The method of Steps A to I can provide similar effectiveness to the first best mode of carrying out the invention.

An evaluation was carried out on an electronic paper produced through Steps A to I and the subsequent step. Evaluation items and the evaluation method are similar to those in the first best mode of carrying out the invention.

An evaluation result is described.

In evaluating adhesion between a working electrode film and a gel electrolyte membrane, and between a counter electrode film and the gel electrolyte membrane, no white portion was observed with the naked eye.

In evaluating bubble occurrence at the interface between the working electrode film and the gel electrolyte membrane, and at the interface between the counter electrode film and the gel electrolyte membrane, black dots were observed on the a whole surface with an optical microscope.

The ionic conductivity $\sigma$(S/cm) of the gel electrolyte membrane of PVdF-HFP-based gel was $\sigma=8.0\times10^{-5}$ (S/cm).

An evaluation was carried out on the effectiveness obtained by creating gaps between the sealing film 6 and the gel electrolyte membrane 10 of the electronic paper.

Whether or not there are gaps were carried out as follows. An electrochemical cell was allowed to undergo aging at 45° C. with 80% RH for one week. An evaluation was conducted by measuring a change in weight through aging. A sample (sample with gaps) produced in the third best mode of carrying out the invention was used as the subject of the evaluation. As a comparative subject of the evaluation, a sample (sample without gaps) produced in the first best mode of carrying out the invention was used.

Whether or not there were gaps is described. The weight of each sample before and after the aging was as follows.

|  | Before Aging | After Aging |
| --- | --- | --- |
| Sample with Gaps | 30.511 g | 30.455 g |
| Sample without Gaps | 30.602 g | 30.134 g |

In comparison to the sample without gaps, the sample without gaps had a small change in weight. In the sample with gaps, sufficient sealing performance was obtained because an electrolytic solution does not erode a sealing film; whereas, in the sample without gaps, sealing performance was not sufficiently obtained because an electrolytic solution erodes a sealing film.

Next, a method of producing application examples such as an electric double layer capacitor is described.

The method of producing the application examples such as an electric double layer capacitor is basically similar to the above-mentioned method of producing a cell of an electronic paper. Additionally, electrodes of counter electrode films 1, electrodes of working electrode films 7 and electrolytic solutions of sol-gel precursors in the application examples such as an electric double layer capacitor are similar to the electrodes of the counter electrode films 1, the electrodes of the working electrode films 7 and the electrolytic solutions of the sol-gel precursors respectively in the application examples such as an electric double layer capacitor explained in the first best mode of carrying out the invention.

Thus, according to the best mode of carrying out the present invention, it is possible to provide a novel electrochemical cell having a working electrode film, a counter electrode film facing the working electrode film, a gel electrolyte membrane sandwiched between the working electrode film and the counter electrode film, and a sealing portion sealing the circumference of the gel electrolyte membrane; where the working electrode film and the counter electrode film have flexibility.

According to the best mode of carrying out the present invention it is possible to provide a novel method of producing an electrochemical cell including a step of inserting a sol-gel precursor into a pore of a mold film provided in a counter electrode film; a step of cooling the sol-gel precursor to prepare a semi-harden gel; a step of peeling the mold film from the counter electrode film; a step of forming a gel electrolyte membrane by cooling the semi-hardened gel; and a step of providing a sealing film on the counter electrode film such that a pore of the sealing film corresponds to the gel electrolyte membrane.

It should be noted that the present invention is not limited to the above-mentioned best mode of carrying out the invention but able to employ various other structures without deviating it from the gist of the present invention, of course.

Next, a fourth best mode of carrying out the invention concerning an electrochemical cell and a production method thereof is described.

Figure 8:
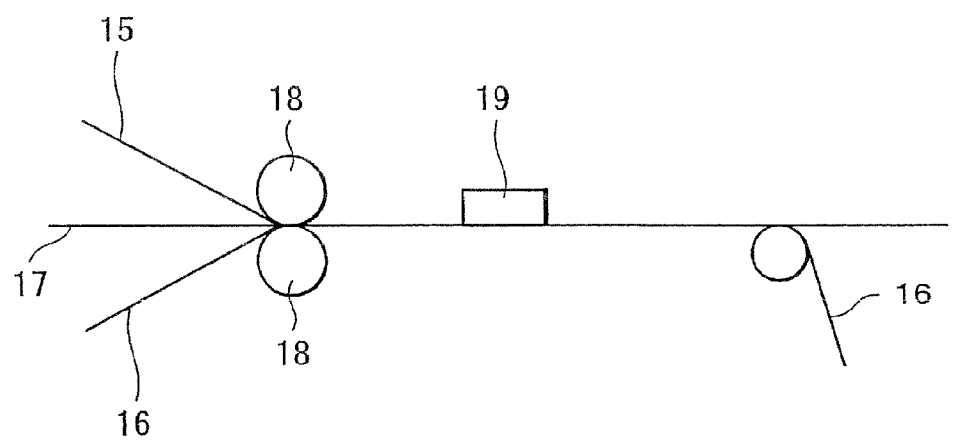
FIG. 8 is a view showing a step in producing a cover-attached mold sealing film.
Figure 10:
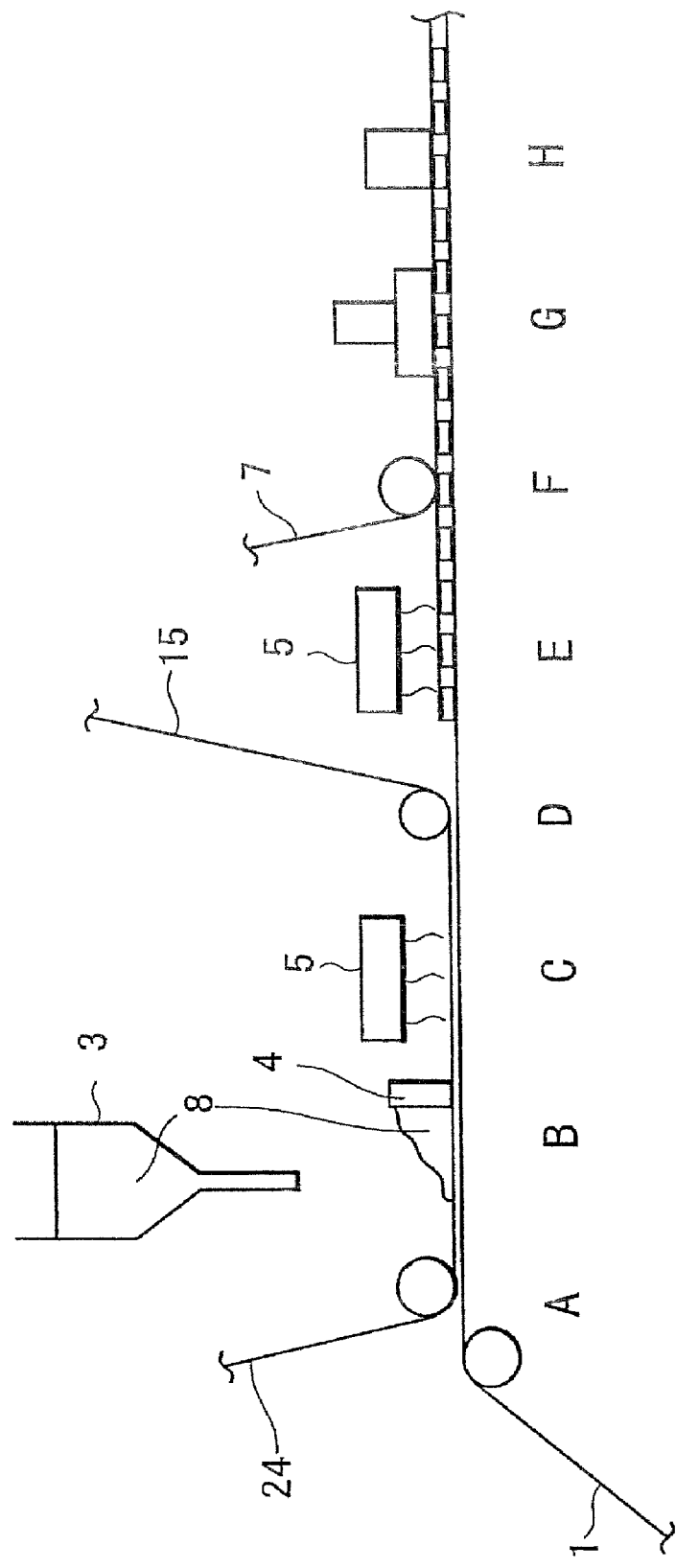
FIG. 10 is a view showing another example of a step of producing an electrochemical cell.
Figure 11A:
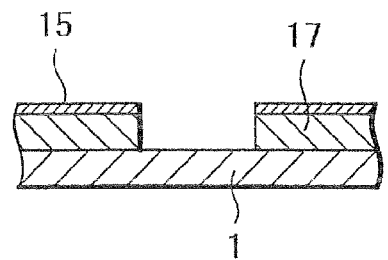
FIG. 11 includes views showing details of the step in FIG. 10 (Part 1).
Figure 11B:
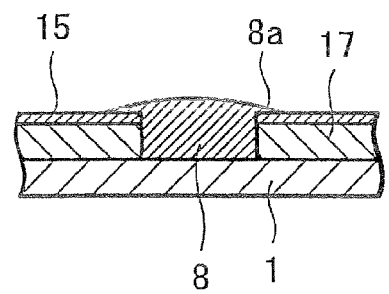
Figure 11C:
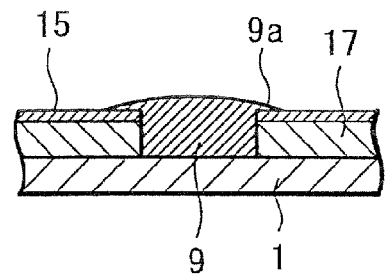
Figure 11D:
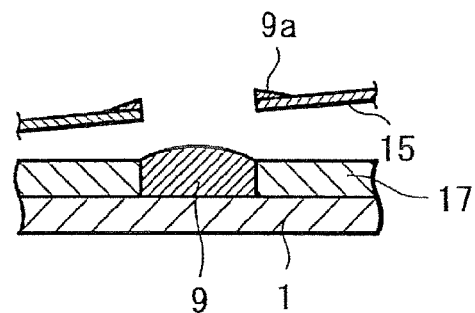
Figure 11E:
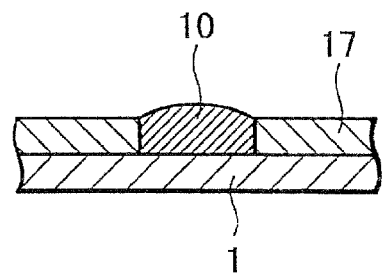
Figure 12A:
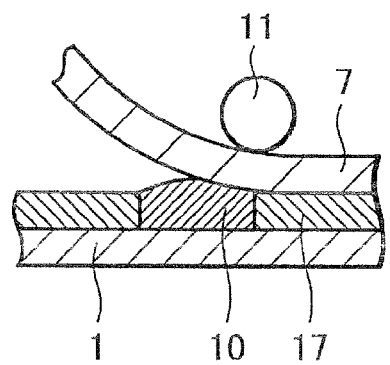
FIG. 12 includes views showing details of the step in FIG. 10 (Part 2).
Figure 12B:
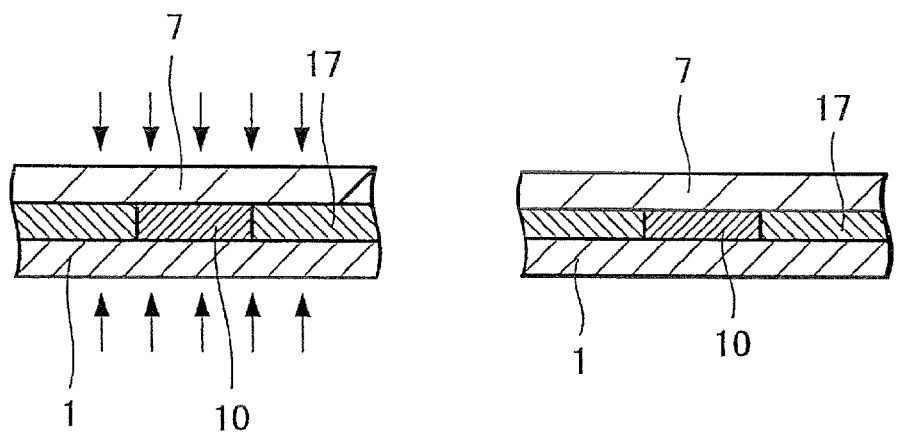
Figure 12C:
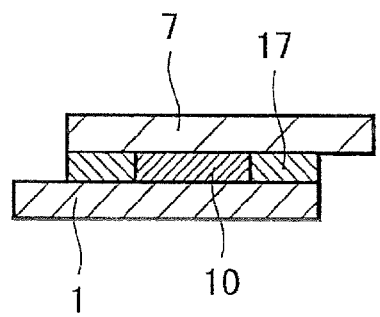

A method of producing an electrochemical cell is described. FIG. 8 is a view showing a production step of a cover-attached mold sealing film. FIG. 10 is a view showing another example of a production step of an electrochemical cell. FIG. 11 and FIG. 12 are views showing details of the step in FIG. 10.

Figure 9A:
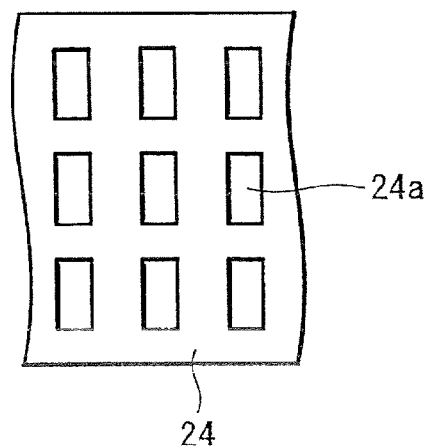
FIG. 9 includes views showing the structure of a cover-attached mold sealing film.
Figure 9B:
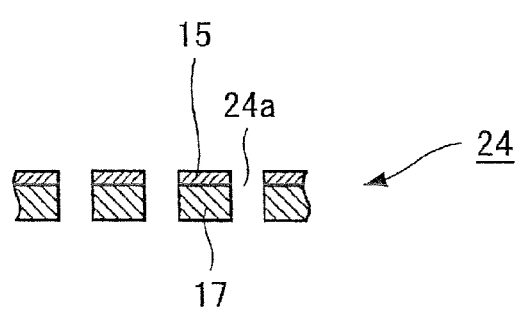

A production step of a cover-attached mold sealing film is described. In this step, a cover film 15, a mold sealing film 17 and a cover film 16 are crimped by rollers 18 and 18, as shown in FIG. 8. Next, a pore is formed by a punching machine 19. Next, a cover-attached mold sealing film is produced by peeling off from the cover film 16. As shown in FIG. 9, a cover-attached mold sealing film 24 includes the cover film 15 and the mold sealing film 17.

The cover film 15 is described.

As the cover film 15, surface-treated polyethylene terephthalate (PET) (produced by Teijin Limited) is used. The surface treatment has been conducted due to facilitating peeling by diminishing the peeling strength between the mold sealing film 17 and the cover film 15.

The thickness of the cover film 15 is 10 μm. The thickness of the cover film 15 is not limited to the aforementioned thickness. It is preferable that the thickness of the cover film 15 be in a range of 5 to 20 μm. If the thickness is 5 μm or more, there is such an advantage that mechanical strength can be obtained. If the thickness is 20 μm or less, there is such an advantage that the mold sealing film 17 and a gel electrolyte membrane 10 (described later) can easily be formed equal in height.

The material of the cover film 15 is not limited to the above-mentioned surface-treated polyethylene terephthalate (PET). Besides, surface-treated polybutylene terephthalate (PBT) polyimide, polycarbonate and the like can be used.

The mold sealing film 17 is described.

As the mold sealing film 17, a three-layer film (NHFM produced by Aichi Plastics Industry Co. Ltd) formed with three layers of polyethylene-polypropylene-polyethylene is used.

The thickness of the mold sealing film 17 is determined such that the thickness of a gel electrolyte membrane 10 becomes the thickness of a set electrolyte membrane when Step H has been completed. The thickness of the set electrolyte membrane will be defined in a description of Step H.

The material of the mold sealing film 17 is not limited to the above-mentioned three-layer film formed with three layers of polyethylene-polypropylene-polyethylene; however, plastic films that are not eroded by a sol-gel precursor may also be used. For example, ionomer resin, modified propylene and the like may be used.

The cover film 16 is described.

The thickness of the cover film 16 is 50 μm. The thickness of the cover film 16 is not limited to the aforementioned thickness. It is preferable that the thickness of the cover film 16 be in a range of 5 to 1000 μm. If the thickness is 5 g m or more, there is such an advantage that mechanical strength can be obtained. If the thickness is 1000 μm or less, there is such an advantage that punching and winding are easy performed.

The material of the cover film 16 is polyethylene terephthalate (PET). The material of the cover film 16 is not limited to the aforementioned polyethylene terephthalate (PET). Polybutylene terephthalate (PBT), polyimide, polycarbonate and the like can also be used.

The pressure in thermocompression bonding is 1000 N/cm². The pressure in thermocompression bonding is not limited to the aforementioned value. In the case of applying various thicknesses and materials to the cover film 15, the mold sealing film 17 and the cover film 16, it is preferable that the pressure in thermocompression bonding be in a range of 500 to 15000 N/cm².

The temperature in thermocompression bonding is 80° C. The temperature in thermocompression bonding is not limited to the aforementioned value. In the case of applying various thicknesses and materials to the cover film 15, the mold sealing film 17 and the cover film 16, it is preferable that the temperature in thermocompression bonding be in a range of 50 to 100° C.

The peeling strength between the cover film 15 and the mold sealing film 17 is 2 N/2 cm. The peeling strength between the cover film 16 and the mold sealing film 17 is 5 N/2 cm. The peeling strength of the thermocompression bonding is not limited to the aforementioned values. In the case of applying various thicknesses and materials to the cover film 15 and the mold sealing film 17, it is preferable that the peeling strength of the thermocompression bonding be in a range of 0.05 to 3 N/2 cm. In the case of applying various thicknesses and materials to the cover film 16 and the mold sealing film 17, it is preferable that the peeling strength of the thermocompression bonding be in a range of 0.2 to 10 N/2 cm.

If the pressure, temperature and peeling strength of the thermocompression bonding are in the above-mentioned ranges, there are such advantages that when force is applied for a thermocompression bonding portion to be peeled off, it is possible to prevent the thermocompression bonding portion from peeling off in a subsequent step; and when force is not applied for a thermocompression bonding portion to be peeled off, it is possible for the thermocompression bonding portion to be peeled off easily.

A pore 24a of the cover-attached mold sealing film 24 is similar to the pore 2a of the mold film 2 in the first best mode of carrying out the invention.

Step A is described. In step A, the cover-attached mold sealing film 24 is provided on the counter electrode film 1 by crimping, as shown in FIG. 10A and FIG. 11A.

The counter electrode film 1 is similar to that in the first best mode of carrying out the invention.

Thermocompression bonding between the counter electrode film 1 and the cover-attached mold sealing film 24 is described.

The pressure in thermocompression bonding is 1000 N/cm². The pressure in thermocompression bonding is not limited to the aforementioned value. In the case of applying various thicknesses and materials to the counter electrode film 1 and the cover-attached mold sealing film 24, it is preferable that the pressure in thermocompression bonding be in a range of 500 to 15000 N/cm².

The temperature in thermocompression bonding is 80° C. The temperature in thermocompression bonding is not limited to the aforementioned value. In the case of applying various thicknesses and materials to the counter electrode film 1 and the cover-attached mold sealing film 24, it is preferable that the temperature in thermocompression bonding be in a range of 50 to 100° C.

The peeling strength between the counter electrode film 1 and the cover-attached mold sealing film 24 is 5 N/2 cm. The peeling strength of the thermocompression bonding is not limited to the aforementioned value. In the case of applying various thicknesses and materials to the counter electrode film 1 and the cover-attached mold sealing film 24, it is preferable that the peeling strength of the thermocompression bonding be in a range of 0.2 to 10 N/2 cm.

If the pressure, temperature, and peeling strength of the thermocompression bonding are in the above-mentioned ranges, there is such an advantage that a thermocompression bonding portion can be prevented from peeling off in a subsequent step.

Step B is described. In Step B, a sol-gel precursor is formed by heating and mixing a gelating agent and an electrolytic solution at a predetermined temperature inside a supply unit 3, as shown in FIG. 10B and FIG. 11B. This sol-gel precursor is supplied to a coating unit 4. The coating unit 4 applies the sol-gel precursor to the pore of the cover-attached mold sealing film 24 provided on the counter electrode film 1.

The sol-gel precursor is similar to that in the first best mode of carrying out the invention.

The membrane thickness of a sol-gel precursor 8 applied to the inside of the pore 24a of the cover-attached mold sealing film 24 is determined such that the thickness of the gel electrolyte membrane 10 corresponds to the thickness of a set electrolyte membrane when Step H has been completed.

Step C is similar to that in the first best mode of carrying out the invention.

Step D is described. In Step D, the cover film 15 is peeled off from the mold sealing film 17, as shown in FIG. 10D and FIG. 11D.

Figure 17:
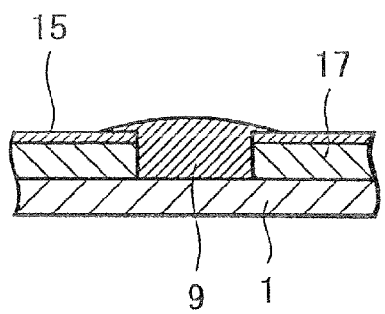
FIG. 17 is a sectional view showing an electrochemical cell utilizing a mold sealing film.

FIG. 17 is a sectional view showing an electrochemical cell utilizing a mold sealing film. Results of peeling strength tests by a tensile testing machine are compared. The peeling strength between the cover film 15 and the mold sealing film 17 is 2 N/2 cm, and the peeling strength between the counter electrode film 1 and the mold sealing film 17 is 5 N/2 cm. The peeling strength of the latter is greater than the peeling strength of the former. Thus, if the cover film 15 is peeled off, the mold sealing film 17 will not be peeled off from the counter electrode film 1.

Step E is similar to that in the first best mode of carrying out the invention.

Steps F to H and a subsequent step are similar to Steps G to I and the subsequent step in the first best mode of carrying out the invention.

Steps A to H and a subsequent step will be described. In these steps, an electrochemical cell is produced by the roll-to-roll system. Production of an electrochemical cell of the present invention is not limited to this roll-to-roll system. It is also possible to produce a single electrochemical cell according to the so-called batch system.

According to the methods included in Steps A to H, it is possible to obtain similar effectiveness to the first best mode of carrying out the invention. It is also possible to omit the positioning of a gel electrolyte membrane and a mold sealing film by using a cover-attached mold sealing film.

An evaluation is carried out on an electronic paper produced by Steps A to H and the subsequent step. Evaluation items and the evaluation method are similar to those in the first best mode of carrying out the invention.

An evaluation result is described.

Adhesion between a working electrode film and a gel electrolyte membrane, and between a counter electrode film and the gel electrolyte membrane were examined, and no white portion is observed with the naked eye.

Bubble occurrence at the interface between the working electrode film and the gel electrolyte membrane, and at the interface between the counter electrode film and the gel electrolyte membrane were examined, and black dots are observed on the whole surface with an optical microscope.

The ionic conductivity $\sigma$(S/cm) of the gel electrolyte membrane of PVdF-HFP-based gel is $\sigma=8.2\times10^{-5}$ (S/cm).

Next, a method of producing application examples such as an electric double layer capacitor is described.

The method of producing application examples such as an electric double layer capacitor is basically similar to the above-mentioned method of producing a cell of an electronic paper. Additionally, electrodes of counter electrode films 1, electrodes of working electrode films 7 and electrolytic solutions of sol-gel precursors in the application examples such as an electric double layer capacitor are similar to the electrodes of the counter electrode films 1, the electrodes of the working electrode films 7 and the electrolytic solutions of the sol-gel precursors respectively in the application examples such as an electric double layer capacitor explained in the first best mode of carrying out the invention.

According to an electrochemical cell using a gel electrolyte membrane of PVdF-HFP-based gel, it possible to obtain similar effectiveness to the first best mode of carrying out the invention.

Thus, according to the best mode of carrying out the invention, it is possible to provide a novel electrochemical cell including having a working electrode film, a counter electrode film facing the working electrode film, a gel electrolyte membrane sandwiched between the working electrode film and the counter electrode film, and a sealing portion sealing the circumference of the gel electrolyte membrane; where the working electrode film and the counter electrode film have flexibility.

According to the best mode of carrying out the present invention, it is possible to provide a novel method of producing an electrochemical cell including a step of providing on a counter electrode film a cover-attached mold sealing film composed of a cover film and a mold sealing film; a step of inserting a sol-gel precursor into a pore of the cover-attached mold sealing film; a step of cooling the sol-gel precursor to prepare a semi-harden gel; a step of peeling the cover film from the mold sealing film; and a step of forming a gel electrolyte membrane by cooling the semi-hardened gel.

It should be noted that the present invention is not limited to the above-mentioned best mode of carrying out the invention but able to employ various other structures without deviating from the gist of the present invention, of course.

Next, a fifth best mode of carrying out the invention concerning an electrochemical cell and a production method thereof is described.

Figure 13:
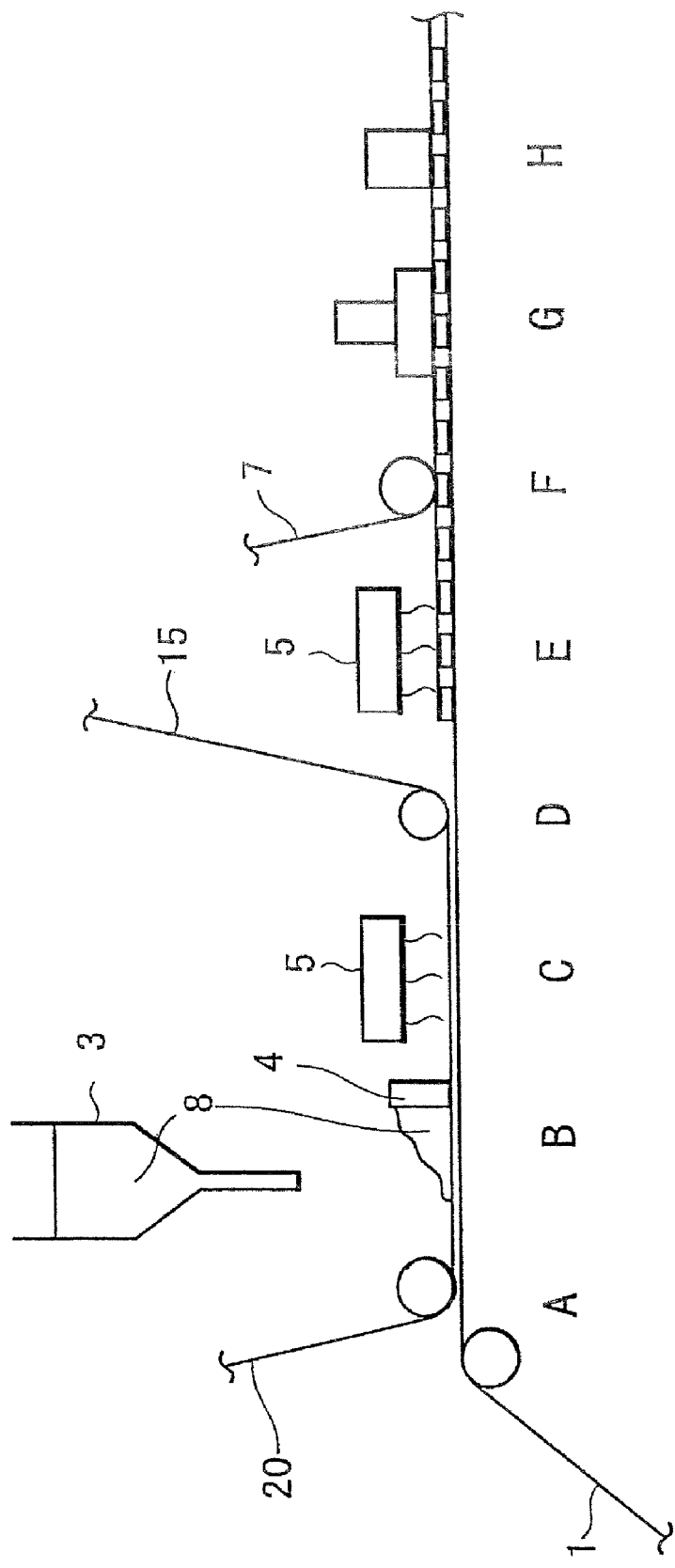
FIG. 13 is a view showing another example of a step in producing an electrochemical cell.
Figure 15A:
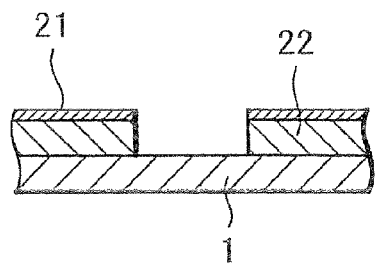
FIG. 15 includes views showing details of the step in FIG. 13 (Part 1).
Figure 15B:
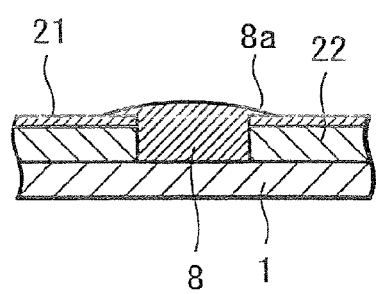
Figure 15C:
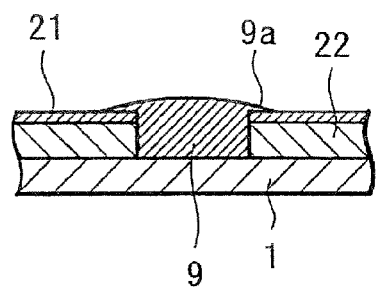
Figure 15D:
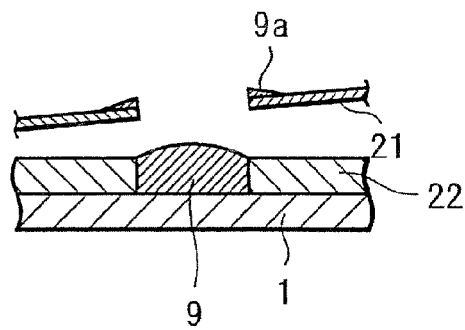
Figure 15E:
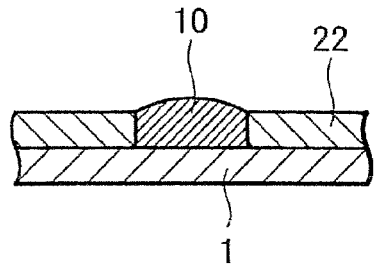
Figure 16A:
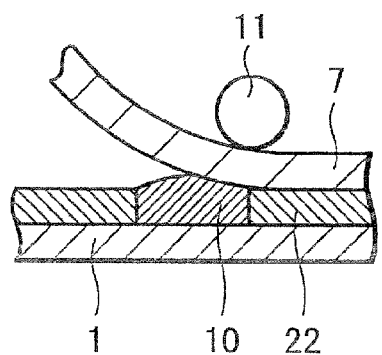
FIG. 16 includes views showing details of the step in FIG. 13 (Part 2).
Figure 16B:
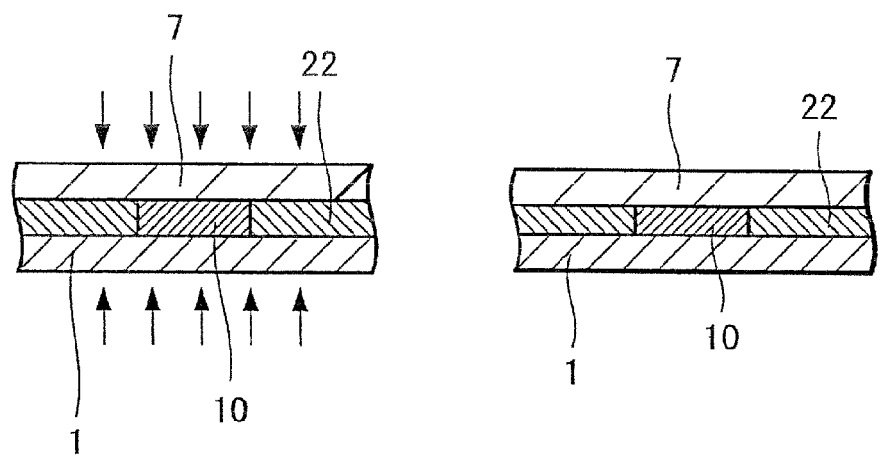
Figure 16C:
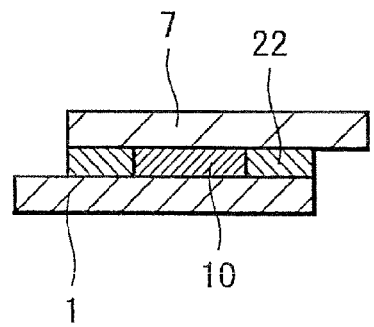

A method of producing an electrochemical cell is described. FIG. 13 is a view showing another example of a production step of an electrochemical cell. FIG. 15 and FIG. 16 are views showing details of the step in FIG. 13.

Step A is described. In step A, a cover-attached adhesive layer film 20 is provided on a counter electrode film 1 by means of crimping, as shown in FIG. 13A and FIG. 15A.

Figure 14A:
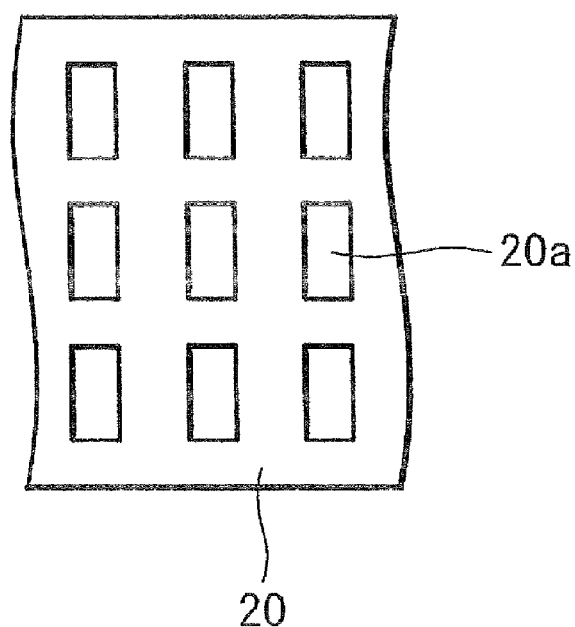
FIG. 14 includes views showing a structure of a cover-attached adhesive layer film.
Figure 14B:
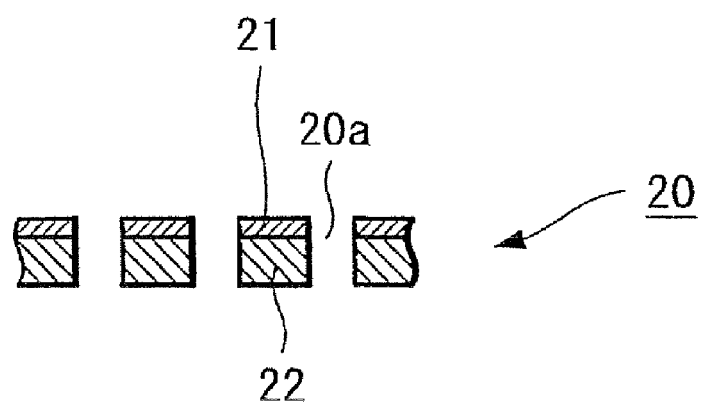

The cover-attached adhesive layer film 20 is described. FIG. 14 shows the structure of the cover-attached adhesive layer film 20. The cover-attached adhesive layer film 20 is composed of a cover film 21 and an adhesive layer 22.

The cover film 21 is described

As the cover film 21, surface-treated polyethylene terephthalate (PET) (50 GS produced by Lintec Corporation) is used. The surface treatment has been conducted due to facilitating peeling by diminishing the peeling strength between the adhesive layer 22 and the cover film 21.

The thickness of the cover film 21 is 10 µm. The thickness of the cover film 21 is not limited to the aforementioned thickness. It is preferable that the thickness of the cover film 21 be in a range of 5 to 20 µm. If the thickness is 5 µm or more, there is such an advantage that mechanical strength can be obtained. If the thickness is 20 µm or less, there is such an advantage that the adhesive layer 22 and a gel electrolyte membrane 10 (described later) can easily be formed equal in height.

The material of the cover film 21 is not limited to the above-mentioned surface-treated polyethylene terephthalate (PET). Surface-treated polybutylene terephthalate (PBT), polyimide, polycarbonate and the like can be used.

As the adhesive layer 22, an adhesive (G9000 produced by Sony Chemicals Corporation) is used. This adhesive is a solvent-free acrylic two-sided adhesive.

The thickness of the adhesive layer 22 is determined such that the thickness of a gel electrolyte membrane 10 corresponds to the thickness of a set electrolyte membrane when Step H has been completed. The thickness of the set electrolyte membrane is to be defined in Step H.

The material of the adhesive layer 22 is not limited to the above-mentioned adhesive (G9000). Materials having electrolytic resistance for maintaining stability concerning products can be used.

The adhesive layer 22 is required to have electrolytic resistance. Accordingly, the electrolytic resistance of the adhesive layer 22 is evaluated.

As an evaluation sample, an adhesive layer formed of the above-mentioned adhesive (G9000) is used.

The evaluation method is similar to that in the first best mode of carrying out the invention. The appropriate range of the electrolytic resistance of the adhesive layer is similar to that in the first best mode of carrying out the invention.

A change in mass is as follows. The adhesive layer formed of the adhesive (G9000) increased by 4 mass %. As a result, the adhesive layer formed of the adhesive (G9000) exhibits superior electrolytic resistance.

The peeling strength between the cover film 21 and the adhesive layer 22 is 5 N/2 cm. The peeling strength of crimping is not limited to the aforementioned value. In the case of applying various thicknesses and materials to the cover film 21 and the adhesive layer 22, it is preferable that the peeling strength be in a range of 0.2 to 10 N/2 cm.

If the peeling strength in crimping is in the above-mentioned ranges there are such advantages as follows: when peeling force is not applied to a crimped part to be peeled off, the crimped part can be prevented from being peeled off in a subsequent step; and when peeling force is applied to a crimped part to be peeled off, the crimped part can be peeled off easily.

The counter electrode film 1 is similar to that in the first best mode of carrying out the invention.

Crimping between the counter electrode film 1 and the cover-attached adhesive layer film 20 is described.

The pressure in crimping is 5000 N/cm². The pressure in crimping is not limited to the aforementioned value. In the case of applying various thicknesses and materials to the counter electrode film 1 and the cover-attached adhesive layer film 20, it is preferable that the pressure in crimping be in a range of 1000 to 15000 N/cm².

The temperature in crimping is normal temperature. The temperature in crimping is not limited to the aforementioned value. In the case of applying various thicknesses and materials to the counter electrode film 1 and the cover-attached adhesive layer film 20, it is preferable that the temperature in crimping be in a range of 5 to 80° C.

The peeling strength between the counter electrode film 1 and the cover-attached adhesive layer film 20 is 15 N/2 cm. The peeling strength in crimping is not limited to the aforementioned value. In the case of applying various thicknesses and materials to the counter electrode film 1 and the cover-attached adhesive layer film 20, it is preferable that the peeling strength of the crimping be in a range above 15 N/2 cm.

If the pressure, temperature and peeling strength of the crimping are in the above-mentioned ranges, there is such an advantage that sufficient adhesion can be obtained.

Step B is described. In Step B, a sol-gel precursor is formed by heating and mixing a gelating agent and an electrolytic solution at a predetermined temperature inside a supply unit 3, as shown in FIG. 13B and FIG. 15B. This sol-gel precursor is supplied to a coating unit 4. The coating unit 4 applies the sol-gel precursor to a pore of the cover-attached adhesive layer film 20 provided on the counter electrode film 1.

The sol-gel precursor is similar to that in the first best mode of carrying out the invention.

The membrane thickness of a sol-gel precursor 8 applied to the inside of a pore 20a of the cover-attached adhesive layer film 20 is determined such that the thickness of the gel electrolyte membrane 10 corresponds to the thickness of a set electrolyte membrane when Step H has been completed.

Step C is similar to that in the first best mode of carrying out the invention.

Step D is described. In Step D, the cover film 21 is peeled off from the adhesive layer 22, as shown in FIG. 13D and FIG. 15D.

Figure 18:
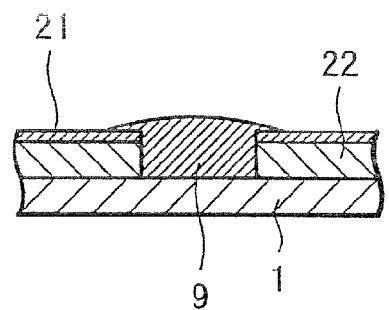
FIG. 18 is a sectional view showing an electrochemical cell utilizing an adhesive layer.
Figure 19:
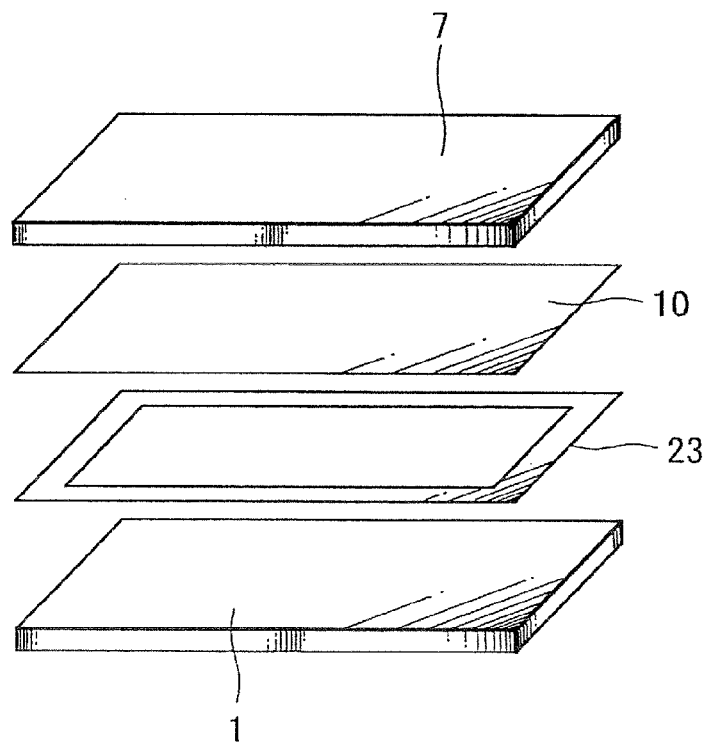
FIG. 19 is a perspective view showing a structure of a conventional electrochemical cell.

FIG. 18 is a sectional view showing an electrochemical cell utilizing an adhesive layer. Results of peeling strength tests by a tensile testing machine are compared. The peeling strength between the cover film 21 and the adhesive layer 22 is 5 N/2 cm, and the peeling strength between the counter electrode film 1 and the adhesive layer 22 (crimped at normal temperature) is 15 N/2 cm. The peeling strength of the latter is greater than the peeling strength of the former. Thus, if the cover film 21 is peeled off, the adhesive layer 22 will not be peeled off from the counter electrode film 1.

Step E is similar to that in the first best mode of carrying out the invention.

Step F is described. In Step F, a working electrode film 7 is provided on the adhesive layer 22 by crimping, as shown in FIG. 13F and FIG. 16A.

The working electrode film 7 is similar to that in the first best mode of carrying out the invention.

Crimping between the working electrode film 7 and the adhesive layer 22 is described.

The pressure in crimping is 5000 N/cm². The pressure in crimping limited to the aforementioned value. In the case of applying various thicknesses and materials to the working electrode film 7 and the adhesive layer 22, it is preferable that the pressure in crimping be in a range of 1000 to 15000 N/cm².

The temperature in crimping is normal temperature. The temperature in crimping is not limited to the aforementioned value. In the case of applying various thicknesses and materials to the working electrode film 7 and the adhesive layer 22, it is preferable that the temperature in crimping be in a range of 5 to 80° C.

The peeling strength between the working electrode film 7 and the adhesive layer 22 is 15 N/2 cm. The peeling strength in crimping is not limited to the aforementioned value. In the case of applying various thicknesses and materials to the working electrode film 7 and the adhesive layer 22, it is preferable that the peeling strength of the crimping be in a range above 15 N/2 cm.

If the pressure, temperature and peeling strength of the crimping are in the above-mentioned ranges, there is such an advantage that sufficient adhesion can be obtained.

Step G is described. In Step G, pressurization and heating is conducted with the working electrode film 7 and the counter electrode film 1 being sandwiched, as shown in FIG. 13G and FIG. 16B. The pressurization and heating is carried out at a predetermined pressure and temperature for a predetermined time.

The method of pressurization and heating is similar to that in Step H of the first best mode of carrying out the invention.

The pressure is 5000 N/cm$^2$. The pressure is not limited to the aforementioned value. It is preferable that the pressure be in a range of 1000 to 15000 N/cm$^2$.

The temperature is 120° C. The temperature is not limited to the aforementioned value. It is preferable that the temperature be in a range of 100 to 150° C.

The time of the pressurization and heating was 60 seconds. The time is not limited to the aforementioned value. It is preferable that the time of the pressurization and heating be in a range of 30 to 60 seconds.

The peeling strength between the working electrode film 7 and the adhesive layer 22 is 15 N/2 cm. The peeling strength between the counter electrode film 1 and the adhesive layer 22 is 15 N/2 cm. The peeling strengths in crimping are not limited to the aforementioned values. In the case of applying various thicknesses and materials to the working electrode film 7, the adhesive layer 22 and the counter electrode film 1, it is preferable that the peeling strength of the crimping be in a range above 15 N/2 cm.

If the pressure, temperature, time and peeling strength of the crimping are in the above-mentioned ranges, there is such an advantage that sufficient adhesion can be obtained without causing deformation of the adhesive layer 22.

By pressurization and heating, adhesion between the working electrode film 7 and the gel electrolyte membrane 10 and also adhesion between the counter electrode film 1 and the gel electrolyte membrane 10 can be obtained.

Step H is similar to Step I in the first best mode of carrying out the invention.

The adhesive layer 22 has a function as a sealing portion. Additionally, an extra sealing portion can be provided on the outside of this adhesive layer 22.

A step subsequent to Step H is similar to the step subsequent to Step I in the first best mode of carrying out the invention.

Steps A to H and a subsequent step will be described. In these steps, an electrochemical cell is produced by the roll-to-roll system. Production of an electrochemical cell of the present invention is not limited to the use of the roll-to-roll system. It is also possible to produce a single electrochemical cell according to the so-called batch system as well.

According to the methods included in Steps A to H, it possible to obtain similar effectiveness to the first best mode of carrying out the invention. It is also possible to omit the positioning of a gel electrolyte membrane and an adhesive layer by using a cover-attached adhesive layer film.

An evaluation is carried out on an electronic paper produced by Steps A to H and the subsequent step. Evaluation items and the evaluation method are similar to those in the first best mode of carrying out the invention.

An evaluation result is described.

Adhesion between a working electrode film and a gel electrolyte membrane, and between a counter electrode film and the gel electrolyte membrane were examined, and no white portion is observed with the naked eye.

Bubble occurrence at the interface between the working electrode film and the gel electrolyte membrane, and at the interface between the counter electrode film and the gel electrolyte membrane were examined, and black dots are observed on the whole surface with an optical microscope.

The ionic conductivity $\sigma$(S/cm) of the gel electrolyte membrane of PVdF-HFP-based gel is $\sigma=8.1\times10^{-5}$ (S/cm).

Next, a method of producing application examples such as an electric double layer capacitor is described.

The method of producing application examples such as an electric double layer capacitor is basically similar to the above-mentioned method of producing a cell of an electronic paper. Additionally, electrodes of counter electrode films 1, electrodes of working electrode films 7 and electrolytic solutions of sol-gel precursors in the application examples such as an electric double layer capacitor are similar to the electrodes of the counter electrode films 1, the electrodes of the working electrode films 7 and the electrolytic solutions of the sol-gel precursors respectively in the application examples such as an electric double layer capacitor explained in the first best mode of carrying out the invention.

According to an electrochemical cell using a gel electrolyte membrane of PVdF-HFP-based gel, it possible to obtain similar effectiveness to the first best mode of carrying out the invention.

Thus, according to the best mode of carrying out the invention, it is possible to provide a novel electrochemical cell including a working electrode film, a counter electrode film facing the working electrode film, a gel electrolyte membrane sandwiched between the working electrode film and the counter electrode film, and a sealing portion sealing the circumference of the gel electrolyte membrane; where the working electrode film and the counter electrode film have flexibility.

According to the best mode of carrying out the present invention, it is possible to provide a novel method of producing an electrochemical cell including a step of providing on a counter electrode film a cover-attached adhesive layer film composed of a cover film and an adhesive layer; a step of inserting a sol-gel precursor into a pore of the cover-attached adhesive layer film; a step of cooling the sol-gel precursor to prepare a semi-harden gel; a step of peeling the cover film from the adhesive layer; and a step of forming a gel electrolyte membrane by cooling the semi-hardened gel.

It should be noted that the present invention is not limited to the above-mentioned best mode of carrying out the invention but able to employ various other structures without deviating from the gist of the present invention, of course.

Next, comparative examples relating to an electrochemical cell and a production method thereof are explained.

COMPARATIVE EXAMPLE 1

An electronic paper using a gel electrolyte membrane formed of PVdF-HFP gel and also using a rigid electrode plate was produced. A sealing film in the shape of a square was stuck on the rigid electrode plate, a sol-gel precursor heated and melted was dropped into the rigid electrode plate by a dispenser, and an extra rigid electrode plate was used for sealing.

An evaluation was carried out on an electronic paper produced. Evaluation items and the evaluation method are similar to those in the first best mode of carrying out the invention.

An evaluation result is described

Adhesion between a working electrode film and a gel electrolyte membrane, and between a counter electrode film and the gel electrolyte membrane were examined, white parts were observed on the whole surface with the naked eye.

Bubble occurrence at the interface between the working electrode film and the gel electrolyte membrane, and at the interface between the counter electrode film and the gel electrolyte membrane were examined, and black dots were only observed on 50% of the whole surface with an optical microscope.

The ionic conductivity $\sigma$(S/cm) of the gel electrolyte membrane of PVdF-HFP-based gel was $\sigma = 1.0 \times 10^{-6}$ (S/cm).

COMPARATIVE EXAMPLE 2

Production of a gel electrolyte membrane formed of PVdF-HFP-based gel was attempted according to the following method. Punching and machining a PVdF-HFP-based gel—plain film was attempted. This method is an orthodox production method of an adhesive sheet. However, since liquid components are contained in the gel to a large extent, and so there is little mechanical strength, it is impossible to conduct punching and machining later. Thus, an electronic paper may not be produced.

COMPARATIVE EXAMPLE 3

Production of a gel electrolyte membrane formed of acrylic gel was attempted according to the following method. Punching and machining of an acrylic gel—plain film was attempted. However, since liquid components are contained in the gel to a large extent, and so there is little mechanical strength, it is impossible to conduct punching and machining later. Thus, an electronic paper may not be produced. Additionally, acrylic gel includes an electrolytic solution and a monofunctional/multifunctional acrylic monomer are mixed together, and the monomer is polymerized and thusly gelated.

COMPARATIVE EXAMPLE 4

A gel electrolyte membrane formed of acrylic gel was produced using a mold film. An acrylic monomer is not gelated in the presence of oxygen. If, in order for the acrylic monomer to be gelated, a cover film (PET) is mounted and hardened by ultraviolet rays, even an application runover portion is completely hardened, thereby getting it stuck to the mold film. When the mold film is peeled off, a gel is also peeled off. Also, in the affixation of a working electrode film afterward, tack is needed to establish contact with an electrode; here, it should be noted that polymerization takes place only when oxygen is shut out, so that if the film is peeled off in the midst of the step, polymerization may not further be developed.

COMPARATIVE EXAMPLE 5

An acrylic monomer is dropped until the thickness corresponds to a sealing portion, while maintaining the state of a liquid monomer; a working electrode film is bonded thereto to form a cell. Subsequently, the working electrode film is gelated by light or heat while oxygen on the outside is shut out. In this case, fine control of the amount of a compound liquid of the acrylic monomer and an electrolytic solution to be dropped is necessary. Moreover, since it is necessary to lower viscosity so as to drop the compound liquid which is difficult for putting into practice.

COMPARATIVE EXAMPLE 6

An electronic paper using a gel electrolyte membrane formed of acrylic gel and also using a rigid electrode was produced. An empty cell having certain gaps provided in advance was produced. Next, the empty cell was filled with the mixture formed by sufficiently agitating an electrolytic solution, titanium oxide, an acrylic monomer and an initiator, by vacuum injection. Next, an injection opening was covered. Next, acrylic was gelated by forming the initiator reacted by heating.

An evaluation of ionic conductivity was carried out on an electronic paper produced. The evaluation method is similar to that in the first best mode of carrying out the invention.

The ionic conductivity $\sigma$(S/cm) of the gel electrolyte membrane of acrylic gel was $\sigma = 9.0 \times 10^{-6}$ (S/cm).

COMPARATIVE EXAMPLE 7

A gel electrolyte membrane formed of Gellan Gum (produced by Wake Pure Chemical Industries Ltd) was produced. An electronic paper was produced using this gel electrolyte membrane. However, satisfactory electrochemical performance was not obtained with Gellan Gum. The ionic conductivity $\sigma$ of the gel electrolyte membrane was as follows: $\sigma = 2 \times 10^{-6}$ (S/cm). Additionally, Gellan Gum is a kind of physical gel.

| | DESCRIPTION OF REFERENCE NUMERALS |
|---|---|
| 1 | COUNTER ELECTRODE FILM |
| 2 | MOLD FILM |
| 2a | PORE |
| 3 | SUPPLY UNIT |
| 4 | COATING UNIT |
| 5 | COOLING UNIT |
| 6 | SEALING FILM |
| 6a | PORE |
| 7 | WORKING ELECTRODE FILM |
| 8 | SOL-GEL PRECURSOR |
| 8a | APPLICATION RUNOVER PORTION |
| 9 | SEMI-HARDENED GEL |
| 9a | APPLICATION RUNOVER PORTION |
| 10 | GEL ELECTROLYTE MEMBRANE |
| 11 | ROLLER |
| 12 | GEL SOLUTION |
| 12a | APPLICATION RUNOVER PORTION |
| 13 | HEATING UNIT |
| 14 | SPACE |
| 15 | COVER FILM |
| 16 | COVER FILM |
| 17 | MOLD SEALING FILM |
| 18 | ROLLER |
| 19 | PUNCHING MACHINE |
| 20 | COVER-ATTACHED ADHESIVE LAYER FILM |
| 20a | PORE |
| 21 | COVER FILM |
| 22 | ADHESIVE LAYER |
| 23 | SEALING MATERIAL |
| 24 | COVER-ATTACHED MOLD SEALING FILM |
| 24a | PORE |

The invention claimed is:

1. A method of producing an electrochemical cell, said method comprising:

a step of inserting a sol-gel precursor into a pore in a mold film provided on a counter electrode film having a thickness of 50 to 500 µm, the pore in the mold film having a length of 5 to 500 mm and a width of 5 to 500 mm;

a step of cooling the sol-gel precursor to form a semi-hardened gel having predetermined viscosity of 20 to 20,000 mPas;

a step of peeling the mold film off from the counter electrode film;

a step of cooling the semi-hardened gel to form a gel electrolyte film having a thickness of 30 to 500 µm;

a step of providing a sealing film on the counter electrode film, with the gel electrolyte film being fitted in a pore of the sealing film; and a step of providing a working electrode film on the sealing film and the gel electrolyte film, with thermocompression bonding.

2. A method of producing an electrochemical cell, said method comprising:

a step of inserting a gel solution into a pore in a mold film provided on a counter electrode film having a thickness of 50 to 500 µm, the pore in the mold film having a length of 5 to 500 mm and a width of 5 to 500 mm;

a step of heating the gel solution to form a semi-hardened gel having predetermined viscosity of 20 to 20,000 mPas;

a step of peeling the mold film off from the counter electrode film;

a step of heating the semi-hardened gel to form a gel electrolyte film having a thickness of 30 to 500 µm;

a step of providing a sealing film on the counter electrode film, with the gel electrolyte film being fitted in a pore of the sealing film; and a step of providing a working electrode film on the sealing film and the gel electrolyte film, with thermocompression bonding.

3. A method of producing an electrochemical cell, said method comprising:

a step of providing a cover attached mold sealing film having a cover film and a mold sealing film on a counter electrode film, the cover film having a thickness of 5 to 20 µm;

a step of inserting a sol-gel precursor into a pore in the cover attached mold sealing film, the pore in the cover attached mold sealing film having a length of 0.5 to 5 mm and a width of 0.5 to 5 mm;

a step of cooling the sol-gel precursor to form a semi-hardened gel having predetermined viscosity of 20 to 20,000 mPas;

a step of peeling the cover film off from the mold sealing film;

a step of cooling the semi-hardened gel to form a gel electrolyte film having a thickness of 30 to 500 µm; and a step of providing a working electrode film on the mold sealing film and the gel electrolyte film, with thermocompression bonding.

4. A method of producing an electrochemical cell, said method comprising:

a step of providing a cover attached adhesive layer film having a cover film and a adhesive layer on a counter electrode film, the cover film having a thickness of 5 to 20 µm;

a step of inserting a sol-gel precursor into a pore in the cover attached adhesive layer film;

a step of cooling the sol-gel precursor to form a semi-hardened gel having predetermined viscosity of 20 to 20,000 mPas;

a step of peeling the cover film off from the adhesive layer;

a step of cooling the semi-hardened gel to form a gel electrolyte film having a thickness of 30 to 500 µm; and a step of providing a working electrode film on the adhesive layer and the gel electrolyte film, with thermocompression bonding.

* * * * *